United States Patent [19]
Hallesy et al.

[11] 3,813,065
[45] May 28, 1974

[54] LOCKING MECHANISMS AND ACTUATOR ASSEMBLIES OF COAXIAL LOCKED REMOTELY AT SELECTED LOCATIONS AFTER MOTIONS OF A NEARLY COMPLETE CIRCUMFERENTIAL ONE PIECE CHAMFERED LOCKING RING

[75] Inventors: Harold W. Hallesy; Howard C. Revenig, both of Yakima, Wash.

[73] Assignee: Decoto Aircraft, Inc., Yakima, Wash.

[22] Filed: Apr. 12, 1972

[21] Appl. No.: 243,268

Related U.S. Application Data

[63] Continuation-in-part of Ser. No. 835,527, June 23, 1969, abandoned.

[52] U.S. Cl............... 244/115, 92/25, 188/67, 285/316, 285/321
[51] Int. Cl............................................. B64f 1/12
[58] Field of Search...... 244/63, 115, 114 R, 110 R, 244/102 R, 102 SL; 92/23–28; 188/67; 285/315, 316, 321; 85/8.8; 287/20 P, 52 R

[56] References Cited
UNITED STATES PATENTS

| | | |
|---|---|---|
| 2,229,390 | 1/1941 | Roemer.......................... 188/67 UX |
| 2,764,132 | 9/1956 | Bakke..................................... 92/25 |
| 2,809,721 | 10/1957 | Knights................................. 188/67 |
| 3,108,513 | 10/1963 | Koshobu........................... 188/67 X |
| 3,326,580 | 6/1967 | Munier et al................... 285/321 X |
| 3,415,167 | 12/1968 | Champagne............................. 92/26 |
| 3,434,745 | 3/1969 | Jackman......................... 285/321 X |
| 3,439,943 | 4/1969 | Thorne-Thomsen................ 285/316 |
| 3,455,578 | 7/1969 | Hanes............................. 285/321 X |
| 3,575,087 | 4/1971 | Sherwood......................... 188/67 X |
| 3,578,273 | 5/1971 | Mulgrave............................ 244/115 |

*Primary Examiner*—Milton Buchler
*Assistant Examiner*—Paul E. Sauberer
*Attorney, Agent, or Firm*—Roy E. Mattern, Jr.

[57] ABSTRACT

A locking mechanism for coaxial load carrying members is described, which utilizes a one piece split, chamfered locking ring as a locking member between the load carrying members. Application of predetermined loads to the load carrying members releases the locking ring from its locking condition by flexure of the ring.

18 Claims, 46 Drawing Figures

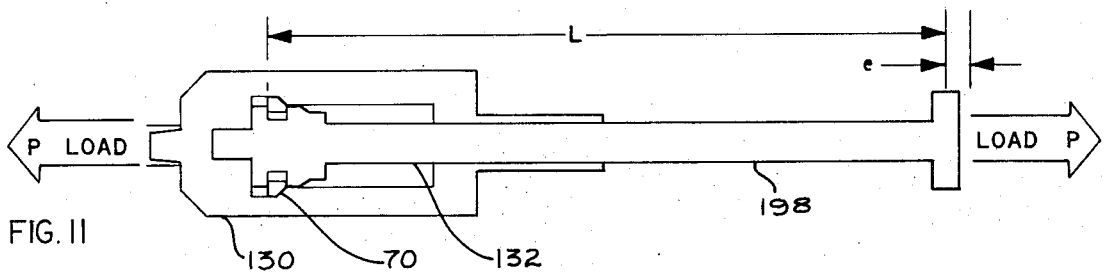

FIG. 11

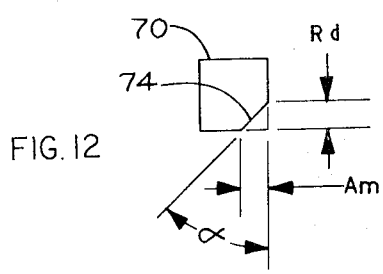

FIG. 12

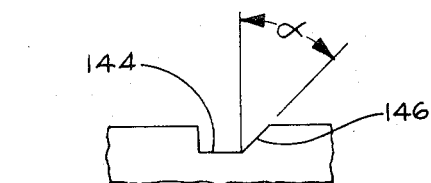

FIG. 13

E = Modulus of elasticity of L

L = Unstressed length of load carrying member e = Longitudinal strain of L

Rd = Radial displacement of locking ring to unlock

Am = Axial displacement of locking ring during its unlock phase.

$\alpha$ = Angle of chamfer on locking ring and lock groove.

S = Average stress in section of length L due to external load P.

$$e = \frac{SL}{E} = Am = Rd \tan \alpha$$

$$\tan \alpha \geq \frac{e}{Rd}$$

FIG. 14

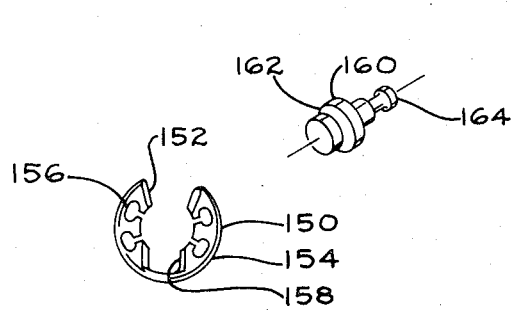

FIG. 15

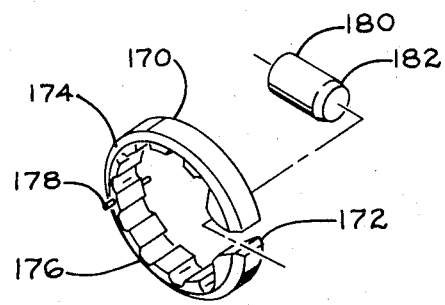

FIG. 16

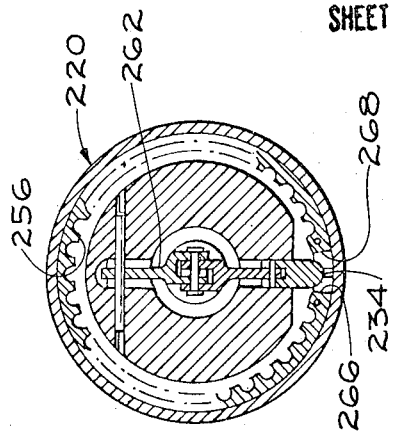
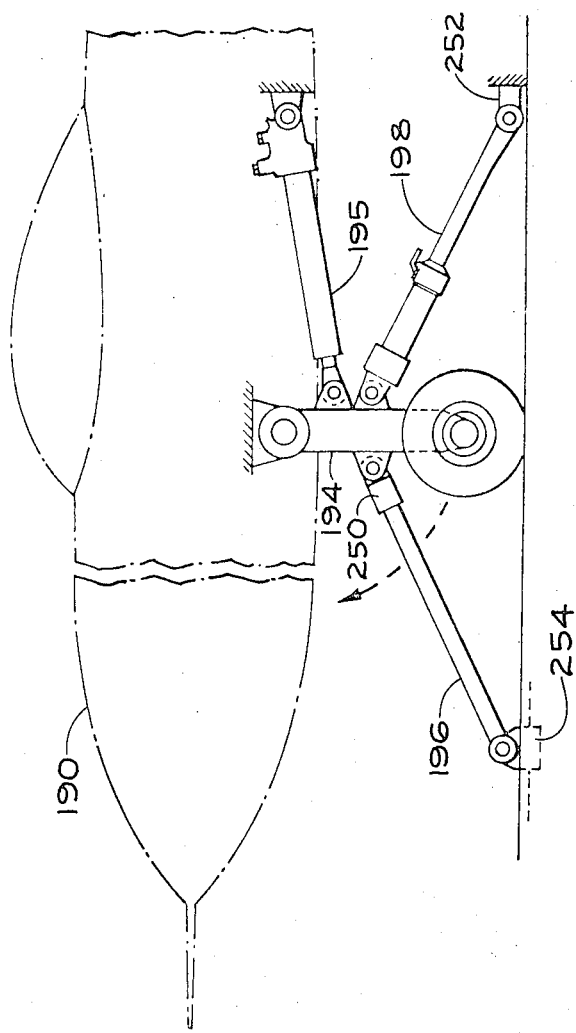
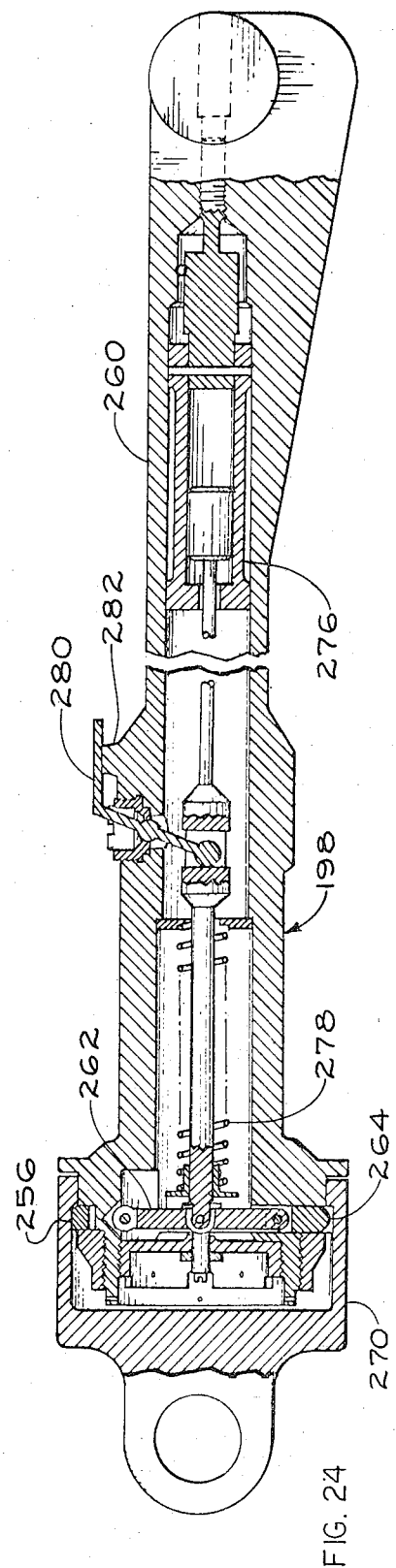

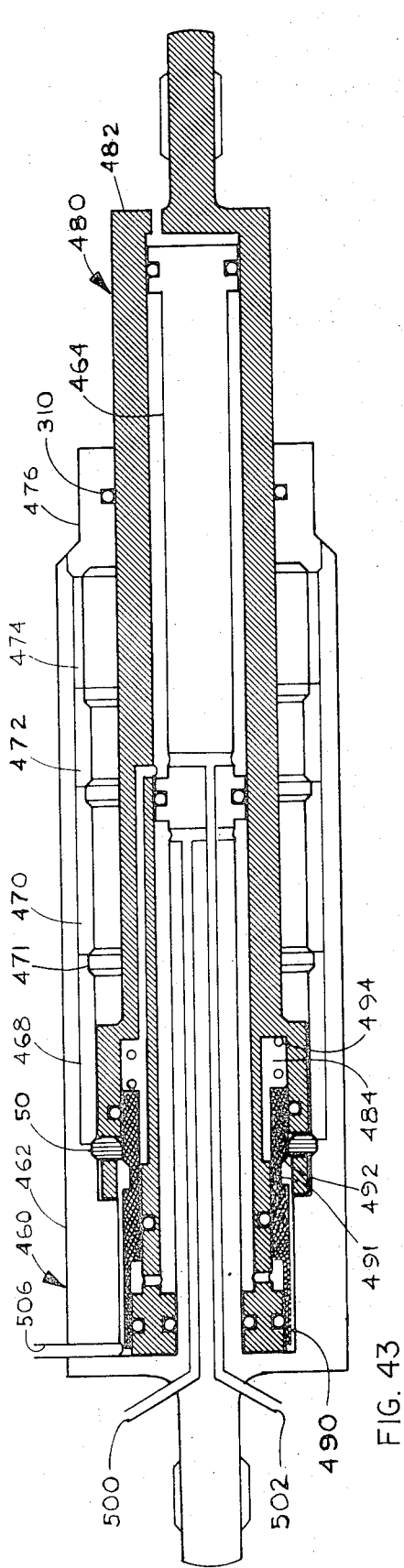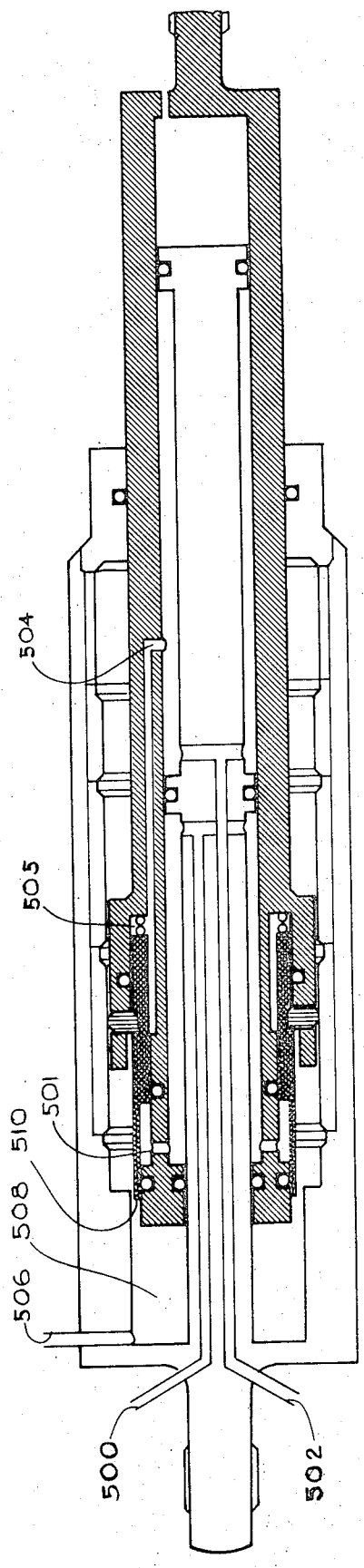
FIG. 43
FIG. 44

LOCKING MECHANISMS AND ACTUATOR ASSEMBLIES OF COAXIAL LOCKED REMOTELY AT SELECTED LOCATIONS AFTER MOTIONS OF A NEARLY COMPLETE CIRCUMFERENTIAL ONE PIECE CHAMFERED LOCKING RING

CROSS REFERENCE

This application is a continuation in part of copending application by the same Applicants entitled "Locking Mechanism for Mutually Interlocking Coaxially Related Members, Otherwise Mechanically Free to Translate Relative to One Another," filed June 23, 1969, and having Ser. No. 835,527, now abandoned. The priority of application Ser. No. 835,527, now abandoned, with respect to the common subject matter of this application is claimed.

BACKGROUND OF INVENTION

Mutual mechanical interlocking devices previously designed and being used, for example, in linear hydraulic actuators and other linear motion devices, in general, are more complex, less reliable, weaker, larger, heavier, more costly, insensitive, and lockable in one or two positions, i.e., for example, a fully retracted and/or fully extended actuator position. When mutual mechanical interlocking devices were wanted for installations requiring both high locking load reliability and low overall installed weights, of all locking mechanisms, none previously were considered completely satisfactory as a starting design to build on. Nor were they considered suitable for modification to be lockable in positions between fully retracted and/or extended locations. None were able to withstand higher ultimate loads without resulting in a need for more installation space. None were designed to utilize a nearly complete ring which could be unlocked under full load.

Prior locking devices satisfying many specifications for internally locking a hydraulic cylinder mechanism are known as "TogLoc" or toggle lock internal locking industrial hydraulic cylinders described in U.S. Pat. No. 2,744,501, by Messrs. Richard C. Chace and George C. Newell Jr. However their operation is limited to two possible locking locations being either fully extended or retracted when locked. Also the specific holding members are by comparison sparsely spaced about the circumference and therefore they are not capable of transmitting as high an axial loading as the Decoto Lock Ring does for a given overall restrictive size installation.

There are other locking mechanisms somewhat like the Tog-Loc such as Mr. Isato Koshobu's rail wheel locking mechanism described in his U.S. Pat. No. 3,108,513. At either the retracted position or the extended position, hydraulic pressure and a spring force are utilized to longitudinally drive a center core which in turn transversely moves several bearing balls against three radial circular segments, serving as the ultimate intercontacting locking members as they partially enter a locking groove. The three part segmental structure of the locking members and the back up bearing balls limit the ultimate axial load transmitting capability. By comparison, the Decoto Lock Ring is substantially a nearly complete locking ring and its expansion or contraction is precisely controlled without reliance on the movement of bearing balls, which could not withstand the forces repeatedly encountered and handled by the Decoto Lock Ring.

Although these prior locking mechanisms have made it possible to internally lock hydraulic actuators at their operating stroke limits, without reliance on external locks, as also alternatively used by Mr. Isato Koshobu, they did not provide internal locks to successfully handle the higher axial loads transmitted through actuating mechanisms of reduced overall diameters and to meet the lower added weight limitations, as often now specified for aircraft components. Moreover, these prior locking mechanisms were not operable at intermediate holding stations located between their overall operating stroke limits. Whereas in contrast, the Decoto Lock Ring, in some of its locking mechanism embodiments, does lock the main actuators at selected intermediate load carrying stations along their overall travel.

Moreover, the nearly complete Decoto Lock Ring is formed to be neutrally at rest at its mid diameter or other design diameter and then to be flexed in respective embodiments to a smaller or larger diameter often by the action of a translating sleeve. In a particular embodiment, wherein airplanes are being launched from aircraft carriers on a steam propelled catapult, the nearly complete locking ring transmits axial loads until a precise strain elongation of a holding bar is reached. When this occurs a translating sleeve has relatively moved, so a Decoto Lock Ring flexes quickly, upon the precisely pre calculated cooperation of the predetermined Alpha angle chamfers, back to its mid-diameter, thereby commencing a quick unlocking sequence, wherein the major reactive force is absorbed internally before final release. Thereafter the aircraft is launched by the full force of the steam catapult and its flight is successfully commenced.

Although nearly complete ring like structures with flex notches are to be found in various machines, they previously have served the assembly coupling or fastening function as snap rings. They are often installed with moving parts, yet the placement of such an assembly is considered static until disassembly occurs at a later time. Or such ring like structures, have been used to radially expand against the interior of a circumferential member to cause the transmission of rotary driving forces. For example, the expansion of shoes, in the form of split spring rings, against the internal surface of a pulley, is illustrated in FIG. 9 of Mr. Charles R. Gabriel's patent describing the construction and operation of a screw machine.

There remained, therefore, a need to improve the internal locking of actuators, by increasing their load carrying capabilities, and insuring their repetitive operations under severe loading, when they had to be unlocked and locked. Moreover, often times, these improvements were needed in an actuator assembly which could be locked at selective load carrying locations throughout its overall travel. The Decoto Lock Ring with its selective immediate controlling components is incorporated into many overall main actuator assemblies to create new internal locking mechanisms, wherein the spring rate of the entire system of each assembly is fully taken into consideration to be able to repeatedly and reliably lock and unlock under loads, which are often very great in magnitude for the overall size envelope of the assembly.

SUMMARY OF THE INVENTION

Therefore to fulfill the existing needs, the Decoto Lock Ring, with its selective position controlling components is made available for incorporation into many overall main actuator assemblies to create new internal locking mechanisms and also to thereby create new main actuator assemblies. They repeatedly operate under extreme axial loads, often operating at midstroke stations, as the nearly complete locking ring of great strength and resiliency is effectively utilized repeatedly to lock and to unlock the coaxial inner and outer load carrying members, which are otherwise free to translate relative to one another.

The Decoto Lock Rings are quickly changed in their effective diameters thereby quickly changing from load to no load conditions and vice versa. In each installation chamfer angles, "Alpha", are calculated in direct relation to the strain to be withstood by all the loaded parts of the overall assembly, i.e. the spring rate of the entire system of each overall assembly is fully considered. Then each locking ring, locking groove, and locking ring sleeve actuator is designed with the selected Alpha angle, so all the repetitive locking ring releases under load will be accomplished without overstressing any of the components. Where a piston-pin, rather than a sleeve actuator is used to control the effective diameter of the Decoto Lock Ring, its design is coupled to the selected Alpha angle used in the chamfer of the locking ring and locking groove.

The availability of the Decoto Lock Ring and the related components of its locking assembly in various embodiments which are all compactly arranged and which by comparison add very little bulk and weight in accomplishing the internal locking function, collectively serve to make it possible to provide new overall major actuating mechanisms which were previously not available nor possible, such as the aircraft catapult launching monitoring mechanisms used on aircraft carriers, and the intermediate locked control positions on actuators of sawmill machinery.

DRAWINGS OF PREFERRED EMBODIMENTS

FIGS. 1, 2, and 3 are perspective views of different locking rings indicating how they are equipped with a chamfered surface and flex notches, the locking ring in FIG. 1 being used in aircraft actuators and made of beryllium copper, the locking ring in FIG. 2 being used in the airplane catapult launching equipment and made of maraging steel, and the locking ring in FIG. 3 being also used in aircraft actuators where a retaining flange is specified; locking rings having inside diameter chamfers and locking structures not being shown;

FIGS. 4, 5, and 6 are persepctive views of different action sleeves, also termed locking pistons, which move axially to control the change in the effective diameter of respective mated locking rings having like chamfer angles Alpha, the sleeve of FIG. 4 being an internal acting sleeve causing expansion of a locking ring, the sleeve of FIG. 5 being an external acting sleeve causing contraction of a locking ring, and the sleeve of FIG. 6 being an external acting sleeve, serving also as a retaining sleeve, to cause contraction of a locking ring;

FIGS. 7, 8, 9, and 10 are schematic cross sectional views indicating the locked, unlocking, and unlock, relative positions of the inner and outer coaxial actuator members, and the locking ring and its action locking sleeve, the fully locked components being shown in FIG. 7, the arrival at the key position where the like chamfer angle Alpha structures are effective during unlocking being shown in FIG. 8, the clearing expansion motion of the locking ring matched to the axial movement of the piston component of the actuator being shown in FIG. 9, and the fully cleared unlocked motion being illustrated in FIG. 10, the motion arrows indicating the axial and radial movements of the respective components;

FIGS. 11, 12, 13, and 14, are both schematic and informative to disclose how the chamfer angles Alpha on the locking ring and locking groove are precisely determined and matched in relation to the strains of the components, principally the strain of the major movable actuator component, the spring rate of the entire system of each overall assembly being fully considered, the diagrammatic assembly in FIG. 11 indicating how all the components are strained with special recognition of the strain of the actuator component, the partial sectional views of the locking ring and locking groove indicating the chamfer size and its angle Alpha being shown in FIGS. 12 and 13, and definitions of terms and their use in formulae being set forth in FIG. 14;

FIGS. 15 and 16 are exploded views of paired locking rings and their immediate actuators called locking pistons, the locking piston shown in FIG. 15 being moved axially to control the locking ring, and the locking piston shown in FIG. 16 being moved radially to control the locking ring; the locking ring in FIG. 15 also indicating how a locking ring in certain assemblies where excessive axial loads are not carried is formed with a greater circumferential opening to facilitate its placement within an overall assembly;

FIGS. 17, 18, 19, 20, 21, 22, all illustrate one embodiment of a holdback bar assembly installed on an aircraft carrier which is repeatedly utilized to hold an aircraft until a sufficient force is reached by a steam catapult to release an airplane for its successful launching, FIG. 17 being a partial side elevation of an airplane secured in place at the commencement of the launching operation, FIG. 18 showing in partial cross section how the major components are positioned when locked, FIG. 19 showing in partial cross section how the major components are positioned when unlocked, FIG. 20 showing in an enlarged partial cross section how paired locking rings and their actuator sleeves are positioned when serving the locking function, FIG. 21 showing in an enlarged partial cross section how the locking rings and their actuator sleeves commence their timed movements during the unlocking, and FIG. 22, illustrating in an enlarged partial cross section how the locking rings and their actuator sleeves, have moved to release the major components, one from the other, to thereby release the airplane to be moved by the effective force of the steam load of the catapult launcher, the substantial reactive forces being absorbed within the major portions of the hold back bar assembly before the complete release of the airplane;

FIGS. 23, 24, and 25, all illustrate another embodiment of a holdback bar assembly used repeatably for successive launchings of airplanes from catapults on aircraft carriers, FIG. 23 being a partial side elevation of an airplane secured in place at the commencement of the launching operation, and FIGS. 24, and 25, respectively, being an enlarged partial longitudinal view with portions removed, and an enlarged cross sectional view to illustrate the locked position of the locking ring in the locking groove and the toggle subassembly holding the locking ring in place.

FIGS. 26, 27, 28, and 29, illustrate how the main landing gear of an aircraft is locked in its down position to sustain the full load of the airplane during landing, FIG. 26 showing the locking ring used which has its principal locking portions on its inside diameter free of flex notches, FIG. 27 showing the locking ring and its sleeve actuator in the locked position, FIG. 28 showing the locking ring and its sleeve actuator commencing their release motions, and FIG. 29 illustrating all the components cleared for the retraction of the landing gear;

FIGS. 30 and 31, respectively, in partial longitudinal and transverse sectional views illustrate how an actuator, suitable for the nose wheel landing gear of an airplane, is locked in its retracted position and an indicator is moved to signal the completion of the locking;

FIGS. 32, 33, and 34, all illustrate in partial longitudinal sectional views how an actuator, suitable for a leading edge slat of an airplane, is locked and unlocked with respect to its retracted position, FIG. 32 showing the final increment of locking movement, FIG. 33 showing the commencement of the clearance of the locking ring and its actuator sleeve, and FIG. 34 illustrating the overall actuator becoming effective in moving the leading edge slat;

FIGS. 35, 36, 37, 38, 39, and 40, all illustrate both partial longitudinal and transverse sections how the actuator shown previously in part in FIGS. 32, 33, 34, is locked and unlocked with respect to its extended position in moving a leading edge slat, FIGS. 35 and 36 showing the locked position, FIGS. 37 and 38, showing the commencement of the releasing sequence of the locking ring and its actuating piston pin, and FIGS. 39 and 40 illustrating the fully released position of all components during retraction of the leading edge slat;

FIGS. 41 and 42 are longitudinal partial sectioned views of a hydraulic actuator which is lockable at selectable places throughout an overall stroke distance, making it suitable, for example, to actuate chipping and sawing machines of lumber mills, FIG. 41 showing the full retracted locked position, and FIG. 42 showing the cleared unlocked position as the actuator is being extended to another selectable locking distance or station, indicating also how the locking distances and stations, during a quickly undertaken modification, are alterable to create a group of selectable locking distances or stations, the locking ring remaining during movements of the actuator with the non moving component of this actuator and the several locking grooves being carried with the moving component of this actuator;

FIGS. 43 and 44 are longitudinal partial sectioned views of a hydraulic actuator which also is lockable at selectable places throughout an overall stroke distance, making it suitable, for example, to actuate an airscoop on an airplane which, as illustrated, is lockable at three stations, fully closed, part way opened, and fully opened, FIG. 43, showing the closed locked position, and FIG. 44, illustrating the unlocked position, as the actuator is moving the airscoop between its closed locked position and its part way opened locked position, indicating also how the locking distances and stations, during a quickly undertaken modification, are alterable to create a group of selectable locking distances or stations, the locking ring moving during operation of the actuator with the moving component of this actuator and the several locking grooves being held by the non moving component of this actuator; and FIGS. 45 and 46, are longitudinal partial sectioned views of a hydraulic actuator used in moving a component of an aircraft engine nacelle for the reversal of the engine thrust, FIG. 45 showing the locked retracted position of the actuator, and FIG. 46 illustrating the unlocked actuator moving freely to place the reverse thrust component into its active position, an axially moving piston-pin actuator being used to move the locking ring into the locking groove.

DESCRIPTION OF PREFERRED EMBODIMENTS

Figure 1:
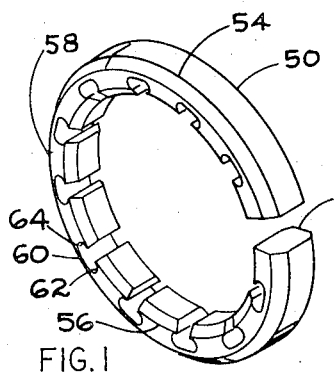

Introduction to Overall Purposes of Using Decoto Lock Rings in All the Preferred Embodiments Throughout the various embodiments there is always installed at least one Decoto Lock Ring manufactured with chamfers and flex notches to its mid neutral diameter or other design diameter. Its own resiliency and its hoop tension or compression under load create a spring action useful during the change of its operational status. In its nearly complete resilient ring form, it always remains circular to fully and evenly distribute loads it carries to surrounding structures.

The Decoto Lock Ring, its locking grooves, and its retention devices are all made with interface angle structures which are principally chamfered surface structures that are precisely determined and controlled because the driving forces developed at these interface structures are utilized to flex the locking ring to unlock the major axial components under load. The number and size of the flex notches of the Decoto Lock Ring are also accurately determined so these driving forces developed at these interface structures effectively flex the locking ring within the proper time and motion sequence without overstressing the lock ring or any of the adjacent components.

In many instances of less severe non critical axial loading, an angle Alpha of approximately 30° for the chamfered interface surface structures is satisfactory. However, in gaining the extreme benefits of handling and locking critically high loads with the flexible Decoto Lock Rings, the angle Alpha is computed by using a formulae. Thereafter, all the cooperating chamfered surfaces of the lock groove, and the axially moved sleeve actuator, and also to a reasonable degree the surfaces of a radial moved locking piston, are mated in reference to this critical angle Alpha. The tangent of this angle Alpha must always be equal to or greater than the quotient resulting when the longitudinal strain of structure serving the function of the piston rod is divided by the radial displacement of the Decoto Lock Ring, which must occur during unlocking of inner and outer coaxial members.

The formulae are:

$e = (SL/E) = Am = Rd$ tangent of angle Alpha where tangent of angle Alpha $\geq e/Rd$ where E is modulus of elasticity of material of length, L and the terms are defined as follows:

$e$ is equal to the longitudinal strain of a piston member, for example of length $L$;

$L$ is the net length of the piston or piston-like member before it is subjected to strain between its holding location;

$Rd$ is equal to the radial displacement of the locking ring which occurs as it unlocks;

$Am$ is equal to the axial displacement of the locking ring during its unlock phase;

Alpha is equal to the angle of chamfer on the locking ring and in the lock groove; and $S$ is the average stress in the coaxial member, such as the piston, having length $L$, which is caused by the external load $P$.

In using the formula, the longitudinal displacement $e$ of the piston L, for example, is calculated when the piston is subjected to the load P when unlocking is to occur. The radial engagement of the locking ring, called the Decoto Lock Ring, and the depth of the locking grooves, $Rd$ are computed upon taking into account, the maximum external load, shear strength of the locking ring material, and the bearing stresses at the interface locale of the locking ring and locking groove. Thereafter, the degrees of the angle of chamfer on the locking ring and the locking groove are computed by using the formula given above.

Following this design criteria, wherein the spring rate of an entire system of each assembly is fully taken into consideration, when the Decoto Lock Ring is installed in all its embodiments the locking loads are distributed in the most efficient way possible, throughout both the immediate locking ring components and the overall structures being locked. At all times during the changeover sequence from a locked and full load operational condition, the change occurs without there being any appreciable increase in the initially well distributed unit bearing loads, as the locking ring remains circular. Therefore, there is no opportunity for any excessive loading that would cause an immediate destruction of any portion of the locking ring or of any other component of the locking mechanism. Moreover, there is no opportunity for any larger loadings, that upon repetition, would cause fatigue destruction of any portion of the locking ring or of any other component of the locking mechanism. The Decoto Lock Ring is designed to load the surrounding reactive groove structures initially away from their entry corner structures and to continually favor such entry corner structures to avoid any breakaway damage to them caused by excessive concentrated loads. When such entry corner structures eventually are loaded the entire adjacent groove structure is already bearing the distributed overall locking load so the unit loading is well below any destructive magnitude, either with respect to immediate or fatigue breakdowns.

In reference to inner and outer coaxial major components relatively movable one to the other in overall major mechanisms, as known today and many to be designed in the future, the incorporation of a Decoto Lock Ring and its related cooperating structures and components does not require any principal overall basic changes in the broad design concepts of the major surrounding principal parts or their own structural environment as known in various industries. Therefore throughout the following descriptions and in the drawings all the parts shown and/or described which are well known such as seals, pistons, cylinders, etc., will not always be shown, described and/or referenced in detail. Only where it is necessary to do so to explain the operation of the locking and unlocking of the Decoto Lock Ring equipped mechanisms, will they be referred to, or where they themselves serve in a new way in the presence of the Decoto Lock Ring, such as in the launching of aircraft from a catapult of an aircraft carrier.

The following description referring to the drawings in the sequence of the pictorial presentation is first directed to the Decoto Lock Ring, its axial translating actuating sleeves, the movement of these locking components in respect to a selected schematic installation, the design criteria regarding determining a chamfer angle Alpha, and the utilization of locking piston actuators. Then following these general descriptions of the immediate locking components, various selected overall major installations are described to show how the Decoto Lock Ring serves so effectively as a locking ring in a wide variety of relatively movable component assemblies, wherein the successful locking function is relied upon completely and its partial or complete failure is critical.

Locking Rings Designated Decoto Lock or Locking Rings Which Are Nearly Complete Resilient Chamfered Split Locking Rings Changeable in Their Effective Diameter and Hoop Tension or Compression Embodiments of locking rings which serve the useful function of repeatedly carrying the entire axial shear load throughout various embodiments of actuators per se and in machinery components locking and/or unlocking under full loads without damaging themselves or adjoining components are shown, by way of examples, by themselves for clearer observation in FIGS. 1, 2, 3, 15, 16, and 26. Subsequently, these are shown when installed in overall embodiments of all the components which are locked by them.

In FIG. 1, the locking ring 50, split at 52 leaving it a substantially complete flexible ring has its principal shear load carrying portion at its outside diameter where it has a chamfer entry structure 54, with its chamfer angle Alpha, being determined by the formulae:

$e = SL/E = Am = Rd \tan \alpha$ $\tan \alpha \geq e/Rd$

Also for its particular installation it has an inside diameter chamfered structure 56 where contact is to be made with a flexing means to change its effective overall diameter. Flex notches 60 are spaced circumferentially to create the needed flexibility of the ring 50 when its diameter is changed from its manufactured mid diameter to its enlarged hoop stressed diameter which is maintained during a locking period. Each of these flex notches 60 has an enlarged portion 62 and an adjoining narrow portion 64. The flex notches, preferably, are not formed in the outer diameter portion which is originally encountering the direct overall axial shear loading. They are not formed until the chamfered structure 54 has been completed. However, on the inside diameter portion which is always protected within a receiving groove on one of the two coaxial inner and outer translating members, the flex notches 60 are fully formed inclusive of any chamfer structures 56.

The flex notches 60 must be sufficient in size and/or number to permit the rapid change in the effective diameter of the locking ring 50 by thoroughly utilizing the forces transmitted quickly by the locking ring flexing means, which is often an axial translating sleeve but may also be an axial translating piston or a radially moving piston. Yet the flex notches 60 may not be excessive in size and/or in number to any extent which would prevent the resilient split nearly complete locking ring from repeatedly and successfully transmitting the entire axial loads. Moreover, the flex notches 60 must be determined to assure the circumferential curvature of the split locking ring will remain circular, so the axial loads are being transmitted as thoroughly and uniformly as possible through the entire circumferential cross section of this chamfered split resilient lock ring as it is also undergoing hoop tension or compression creating forces. Generally locking rings of this configuration are made of Beryllium Copper.

Figure 2:
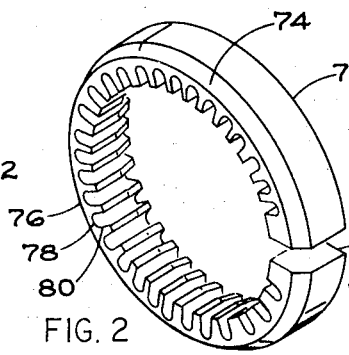

In FIG. 2, another locking ring 70 is illustrated. In this configuration when made of maraging steel in the proper overall sizes, locking ring 70 has effectively and repeatedly held and unlocked under load, airplanes for launching by catapult from aircraft carriers, holding the airplanes until the steam pressure catapult forces have first elongated a restraining bar within its elastic limit to a selected elongation, thereafter resulting in the release of this locking ring 70 at or above 80,000 pounds, as illustrated in FIGS. 17 through 25.

Locking ring 70 transfers the principal shear loading through its outer diameter portions and chamfered structure 74 at this location is very strictly derived by using the formulae for determining the chamfer angle Alpha, as noted previously. Also flex notches 76 are spaced and proportioned to meet similar requirements as discussed in reference to ring 50. The width at the bottom 78 and top 80 of these notches 76 are likewise especially formed. Also these flex notches are not formed into the ring portions where chamfered structure 74 is formed, so the ultimate axial shear loads being carried are not jeopardized.

Figure 3:
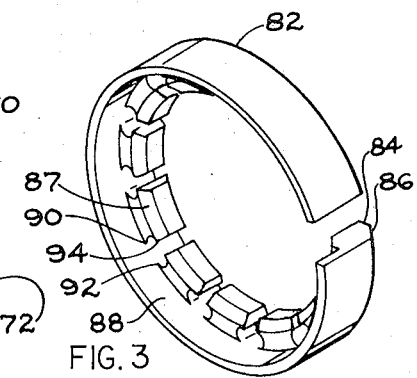

In FIG. 3, an additional locking ring 82 is illustrated to show how such a locking ring 82 may be formed with a retaining rim, flange, or lip 88. As subsequently shown in FIGS. 32, 33, and 34, this retainer flange 88 is an operational and safety feature to keep the ring well positioned and also to keep any possible breakaway portions in place until their rescue is undertaken. There is a split at 84 forming a minimum opening to cooperate with the flex notches 90, which are wider at their bottoms 92 and narrower at their tops 94, in allowing the resilient locking ring to be changed in its effective diameter. Also there are chamfered structures 86 and 87 on the respective outside and inside diameter portions. The chamfered structure 86 being effective in the mating during locking operations is kept clear of flex notches 90.

Figure 4:
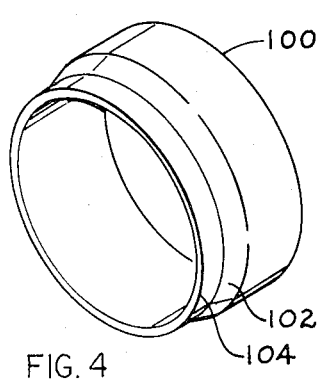
Figure 5:
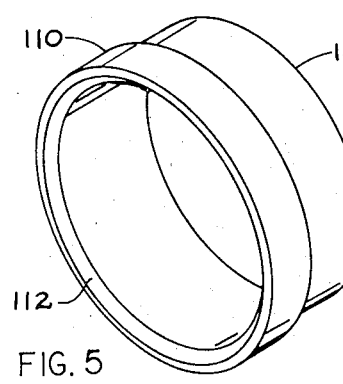
Figure 6:
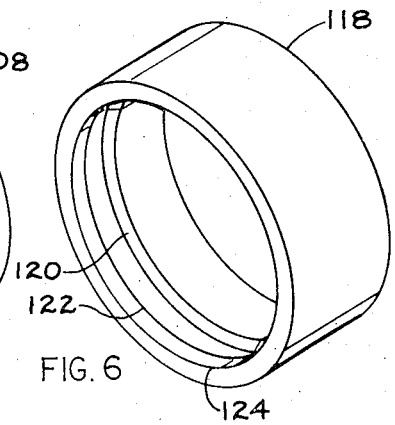

Actuated Sleeves and Pistons Utilized to Flex the Nearly Complete Resilient Chamfered Split Locking Rings to Change Their Effective Diameter and Hoop Tension or Compression In FIGS. 4, 5, and 6, actuated sleeves 100, 108, and 118 are respectively shown, and in FIGS. 15 and 16, actuated pistons 160 and 180, are respectively shown, by way of examples, to illustrate the convenient flexing means utilized to flex the various types of nearly complete resilient chamfered split locking rings of FIGS. 1, 2, 3, etc. In FIG. 4, actuated sleeve 100 is shown having an entry smaller diameter portion 104, followed by a chamfered structure portion 102 of larger diameter, for axial entry into the inside of a locking ring, such as rings 50 or 82 to increase their effective diameter placing them in a locking position to handle the full overall axial shear loads. The angle Alpha of the chamfered structure 102 is matched to the angle Alpha of the chamfered structure, such as chamfered structure 56 on locking ring 50. The formulae is again referred to and it is used in determining the often very critical chamfer angle Alpha.

Figure 26:
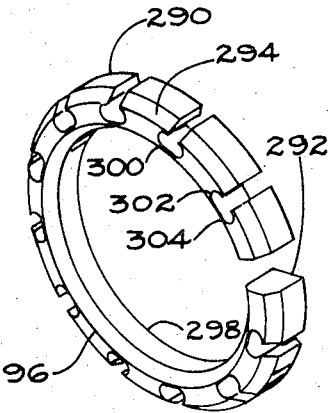

In FIGS. 5 and 6, the actuated sleeves 108 and 118 utilize their interior chamfered structures 112 and 120 to respectively mate with, for example, the chamfered exterior structures 294 on locking ring 290, shown in FIG. 26. Actuated sleeves 108 and 118 decrease the effective diameter of such a resilient split locking ring 290, which is placed in hoop compression during its locking function when its interior diameter portions 298 are directly sustaining the maximum axial shear loads. Also, as indicated in FIG. 6, actuated sleeve 118 has a retaining or positioning groove 122 to locate a locking ring between its entry structure 126 and the chamfered structure 120.

In FIGS. 15 and 16, actuated pistons 160 and 180 are illustrated. Actuated piston 160 is moved axially to enter locking ring 150 and the chamfered structures 162 on piston 160 and 154 on ring 150 are mated using like angles Alpha. Although in most embodiments the locking ring is nearly complete in circumference, where lower axial loads are to be experienced and inspection and quick replacement is desired, the slit opening 152 may be carefully enlarged. Also a recess 158 may be provided to serve as a positioning structure to radially align such a resilient chamfered locking ring 150. In contrast, locking ring 170 is kept almost as a complete locking ring, and also in contrast, although moved by an actuated piston 180, this time piston 180 is moved radially. Its end has a formed structure 182 complementarily formed to the locking ring ends at split 172, which are designed in reference to angles Alpha but the mating structures are spherical in form. The outside diameter portion is a chamfered structure 174 and flex notches 176 are relied upon during changes in the effective diameter of this locking ring 170, which is radially positioned using locating pin 178.

Figure 7:
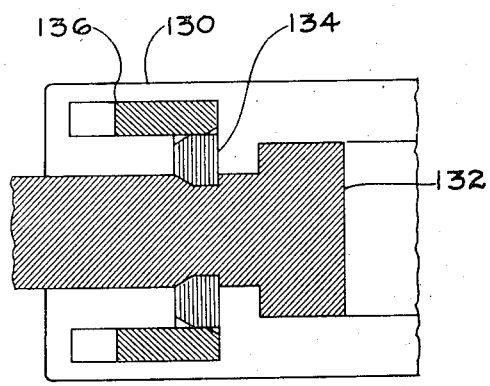

The sleeves and pistons are actuated in the presence of fluids under pressure, by the forces of springs, by mechanical means, by electromechanical means, and/or by manual means, throughout the various embodiments. In particular reference to the actuation of an actuated sleeve by hydraulic fluids, the schematic presentation is given in FIGS. 7, 8, 9, and 10. In FIG. 7, the locked position is shown where resilient split chamfered locking ring 134 is sustaining the full shear load between piston 132 and cylinder 130. The retention of locking ring 134 in its reduced diameter hoop compression configuration is assured by the circumferential presence of the actuated sleeve 136 being also held by the hydraulic fluid under pressure derived from the overall system serving the principal actuator mechanisms, incorporating piston 132 and cylinder 130. In this embodiment sometimes the actuated sleeve 136 is referred to as the locking piston, locking sleeve, locking collar, or locking actuator. Often a spring is used to keep actuated sleeve 136 in place if the hydraulic pressure needs an assist or it is withdrawn.

Figure 8:
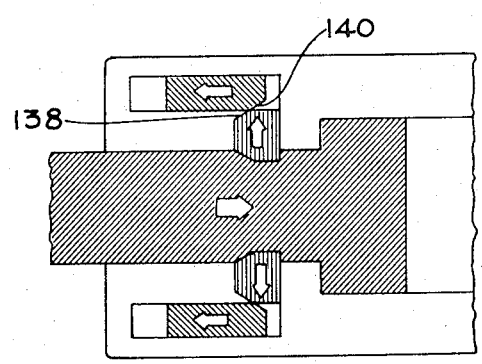
Figure 9:
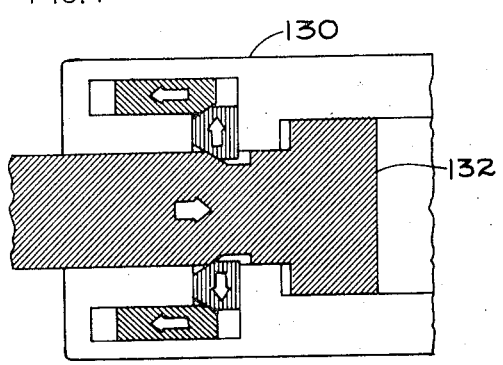
Figure 10:
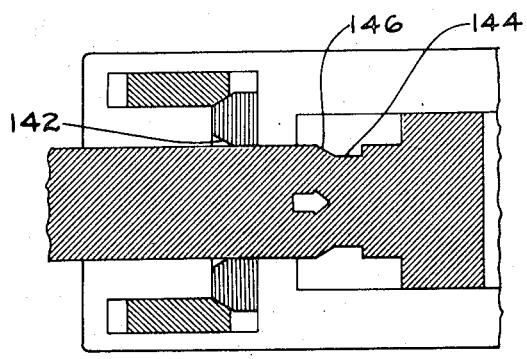
Figure 17:
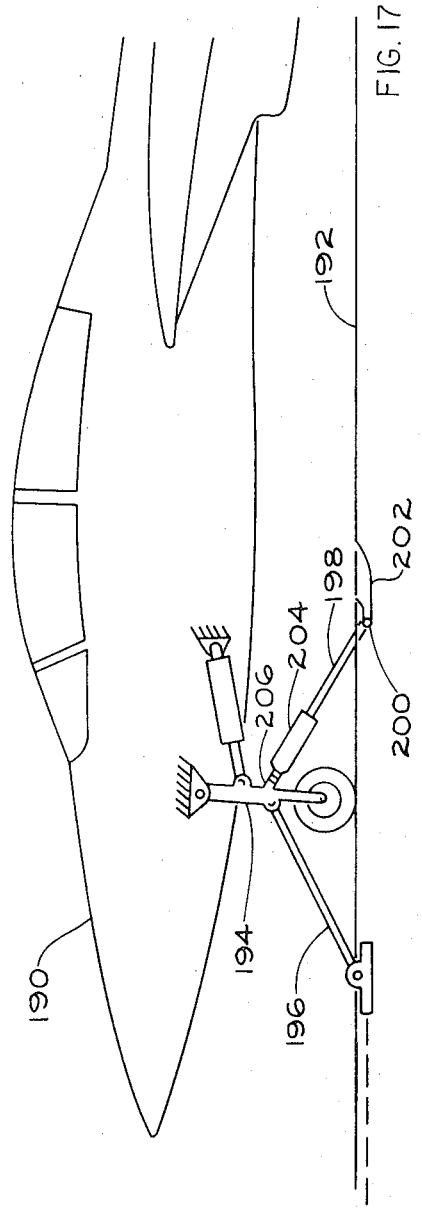

In FIG. 8, the hydraulic pressure has been reversed to extend the piston 132 and the motion arrows show the actuated sleeve 136 under pressure of the hydraulic fluid clearing the resilient locking ring 134. The chamfered structure 138 on the ring 134 and chamfered structure 140 on the sleeve 136, both mated through critical angle Alpha, are at their key point of commencing clearance. In FIG. 9, actuated sleeve 136 is clearing farther away and resilient locking ring 134, through its release of hoop compression forces and the effective utilization of the Alpha angle mated chamfered structure 142 on ring 134 and like chamfered structure 146 in the locking groove or receiving groove 144 of piston 132, is moving radially to its larger diameter. Then in FIG. 10, the fully cleared positions of all the locking mechanism components are illustrated as the piston moves on to its next operational position, where it is preferably locked as this sequence as illustrated in FIGS. 7, 8, 9, and 10 is reversed.

Derivation of Formulae Used in Determining the Chamfer Angle, Alpha

The schematic FIGS. 11, 12, and 13, coupled with the symbols and words of FIG. 14, present the background of the derivation of formulae used in determining the angle, Alpha, which governs the forming of the mating chamfered structures. In respect to this formulae, the spring rate of an entire system of each assembly is fully taken into consideration. FIG. 11, although schematic, is representative of the restraining holdback bar assemblies illustrated in FIGS. 17 – 25 employed during the launching of airplanes from steam propelled catapults of aircraft carriers. The restraining member or piston 198 is undergoing longitudinal strain between where it is restrained by the resilient chamfered locking ring 70 near one end 132 within the cylinder 130 and its securement of its extending end to the structure of the aircraft carrier.

FIGS. 12 and 13 show enlarged schematic portions of locking ring 70 and locking groove 144 to illustrate the like chamfered structures 74 and 146 respectively on ring 70 and cylinder 130. In addition the location of the respective symbols and dimensions used in the formulae are illustrated.

In the following figures of the drawing and in the descriptions, different embodiments utilizing these chamfered mating structures are presented to indicate how wide the range is of relatively movable mechanisms into which the nearly complete flexible, notched, resilient, chamfered split locking ring may be installed to lock the otherwise movable members carrying the full axial shear loads and locking or unlocking under such full loads. Moreover, it will be observed, the incorporation of this chamfered locking ring with its chamfered actuated sleeve or piston and the formation of chamfered receiving or locking grooves is undertaken without adding any substantial weight and without requiring any substantial enlargement of the overall mechanisms. Moreover, locking positions, often easily readjusted, are available between the extremes of the overall principal actuator movement or stroke. In addition the locking is controlled by utilizing various energy sources.

Figure 18:
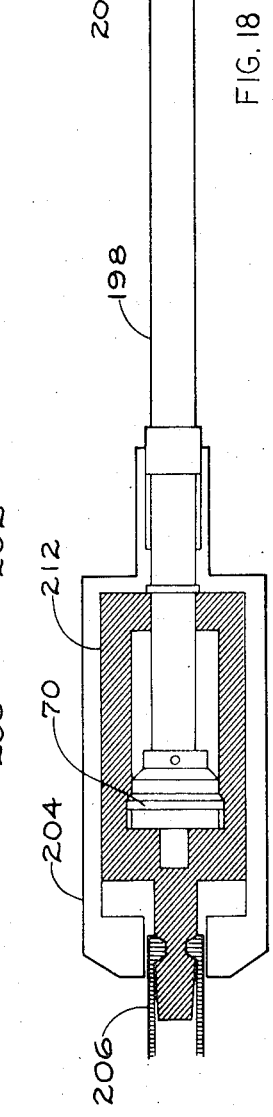
Figure 19:
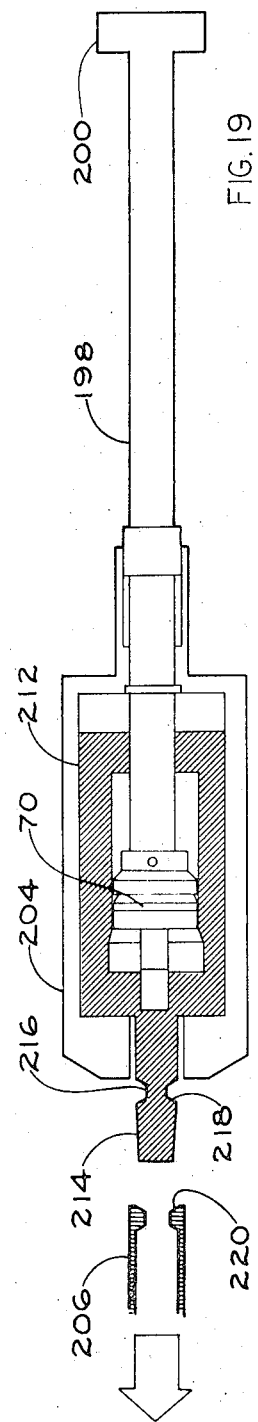
Figure 20:
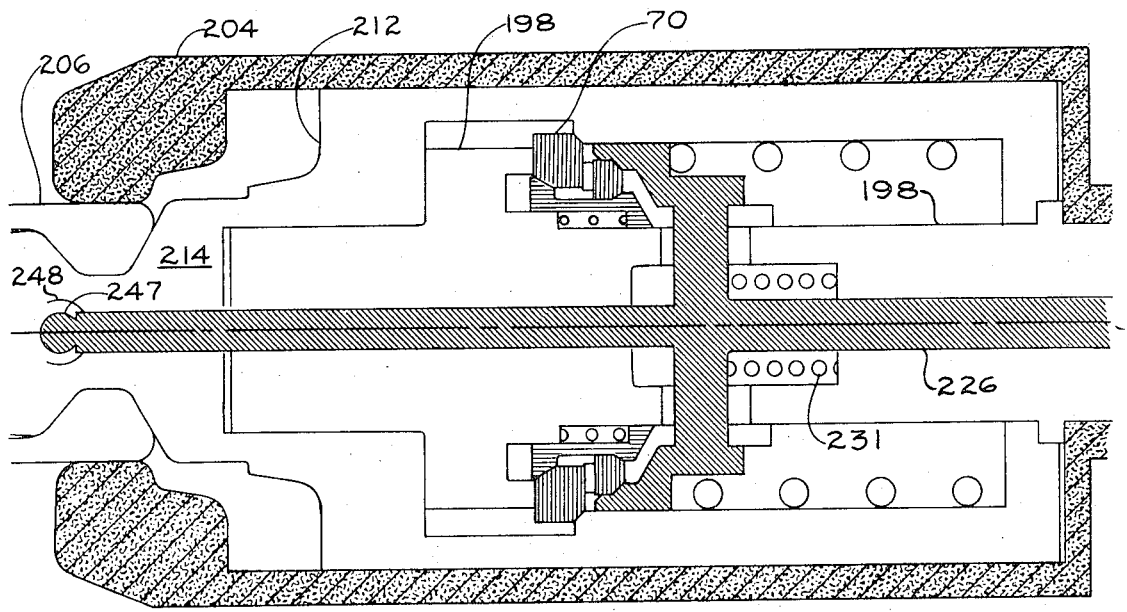
Figure 21:
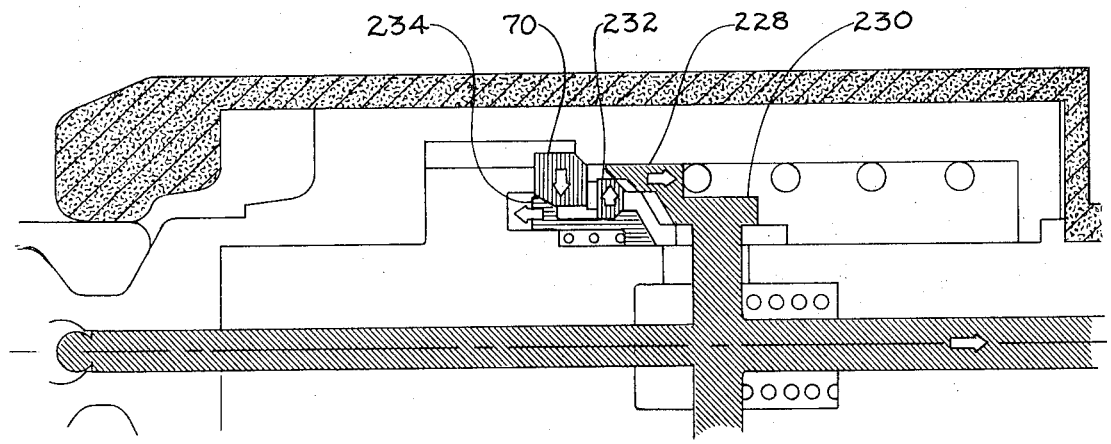
Figure 22:
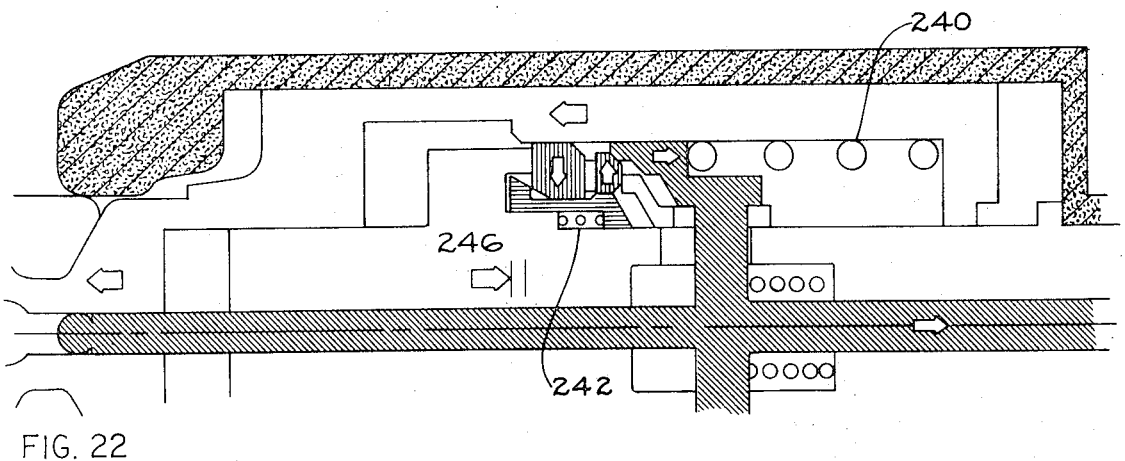

Nearly Complete Resilient, Chamfered, Flex Notched Split Locking Ring Installed in Holdback Bar Assemblies Used on Aircraft Carriers During Launching of Airplanes From Steam Propelled Catapults Throughout FIGS. 17 through 22, a dual set of chamfered split locking rings are shown, and throughout FIGS. 23 through 25, a single chamfered split locking ring is shown, as respective holdback bar assemblies are illustrated. In both assemblies the elongation in a hold back bar 198 is monitored. When it reaches a preselected amount, as represented by reference number 246 by the motion arrow and distance lines in FIG. 22, an actuated sleeve 228 shown in FIGS. 20, 21, and 22 is then effective in clearing a first triggering locking ring 232, and then load transfer sleeve 234 clears the way for the clearing of the principal shear load carrying locking ring 70. In contrast when holdback bar 198 is elongated, in FIG. 24 a toggle mechanism is cleared so locking ring 256 is abruptly withdrawn from its locking position.

In specific reference to the utilization of two locking rings, as illustrated in FIGS. 17 through 22, an airplane 190 with its landing gear 194 down and locked is equipped with a holdback bar assembly. It is secured to transversely spreadable finger structure 206 which are joined together and become part of the landing gear during flight, by using a tongue 214 equipped with chamfered notches 216 to receive engaging protuberances 220 of the finger structures 206. The tongue 214 is secured to a cylinder 212 which in turn is locked to the strain or holdback bar 198 by the locking ring 70, as illustrated in FIGS. 18 and 19. The holdback bar 198, upon movement of airplane 190 is secured to carrier structure 192 as its tee end 200 is guided and dropped into opening 202 in the carrier structure.

Securement of the launching pulling bar 196 to the landing gear is then undertaken using an automatic releasing coupling, not shown. Thereafter with the aircraft engine running and the steam pressure building up the airplane is prepared for launching. As further illustrated in FIGS. 20, 21, and 22 in more detail, the proper setting of the locking rings is observable by noting the presence of the indicating head 247 within the recess 248. Also if the launch is not to occur or be discontinued a manually applied force using a hand tool may initiate full release of the holdback bar assembly.

In these FIGS. 20, 21, 22, the arrangement of some of the interior components are shown, somewhat schematically in greater detail. Surrounding the cylinder 212 is a housing secured to the restraining bar 198 and, through relative motion, positioning the other interior components. The strain release bar assembly with its strain monitoring and release bar 226 is centrally and slidably supported within the holdback bar 198 at one end, and it is, however, firmly secured to the holdback bar 198, where the tee structure 200 is held at the deck 192 of the aircraft carrier. The length dimension of this monitoring or strain release bar, after being adjustably preset, as necessary, thereafter during launching preparations and launching of specific size airplanes remains constant, not undergoing any elongation. Therefore, its end 230, during the holdback operation ultimately becomes effective in withdrawing sleeve 228 from over triggering locking ring 232, as illustrated in FIG. 21. Thereafter, triggering ring 232 clears farther increasing in diameter, and then a load transfer actuating sleeve 234 clears from the path of the contracting principal locking ring 70. Then cylinder 212 moves ahead within housing 204, free of holdback bar 198. During this initial major release of the holding power, substantially all the reactive force is absorbed. Then upon clearing housing 204, the tongue 214 effectively releases the fingered structure 206 attached to the landing gear 194 in the presence of a small reactive force and the airplane is free to be launched by the catapult as the portions of the holdback assembly remaining on the carrier fall safely down the short distance to the deck of the carrier.

Reset springs 231 and 242 are thereafter utilized as the holdback bar assembly is carried to another airplane and reset so it may be effectively reused for a follow on launching of the same size aircraft. When other aircraft of different sizes are to be launched then different strain release rod assemblies may be used.

For clearer understanding of the operation of the locking rings 232 and 70, an internal reactive force energy absorption system sub assembly is not shown. However, when modulus of elasticity derived, preset elongation, is reached, the transfer from the locked to the unlocked condition occurs abruptly, as all the mated chamfered structures are effective in creating the unlocking driving forces against the locking rings, and the reactive release energy is counteracted by absorption so the hold back bar assembly drops down without any noticeable recoil.

Throughout FIGS. 23, 24, and 25 another embodiment of a hold back bar assembly is illustrated having a holdback 198 which is connected between the stationary structure 252 of the catapult or ship and the nose gear 194, as shown in FIG. 23. This assembly 198 guarantees that a sufficient pressure level will be met or exceeded to obtain the specified starting or launching force applied through pulling arm 196 of the catapult. Upon launching a quick disconnect 250 operates to release this pulling arm 196.

As the fluid pressure, generally steam pressure, builds up, catapult holdback bar assembly 198 is progressively tensioned within its elastic limits. Upon reaching a designed loading of its steel outer tube 260 its elongation causes the actuation of an overcenter linkage sub assembly 262 withdrawing a vertical locking piston 264 from between ends 266, 262 of the Decoto Lock Ring 256. Ring 256 decreases in diameter, i.e., collapses, thereby freeing airplane 190 from restraint and it departs carrying only the small cylindrical end 270. The remainder of catapult holdback bar assembly 198 stays with stationary structure 252 of the catapult or ship.

During elongation of steel tube 260, an interior actuator rod 274 is not subjected to the tension forces and stands ready to cooperatively and precisely cause operation of the overcenter linkage sub assembly 262. Adjustments of actuator rod 274 to preset the precise moment of its effectiveness with respect to a preselected restraining force, are undertaken by changing the axial position of its own restraining stop means 276, which is located at its end that is secured to assembly 198 near stationary structure 252.

Spring means 278 assures release of assembly 198 will occur after elongation under preselected tensile stresses and not because of vibrations or other possible spurious causes. If at anytime release is wanted, without going through the lauching procedure, a manual release lever 280 may be pivoted upwardly moving actuator rod 274 to operate overcenter linkage subassembly 262. When this lever 280 is pushed down against its stop 282, it provides visual indication that the entire catapult holdback bar assembly 198 is locked to airplane 190.

Figure 27:
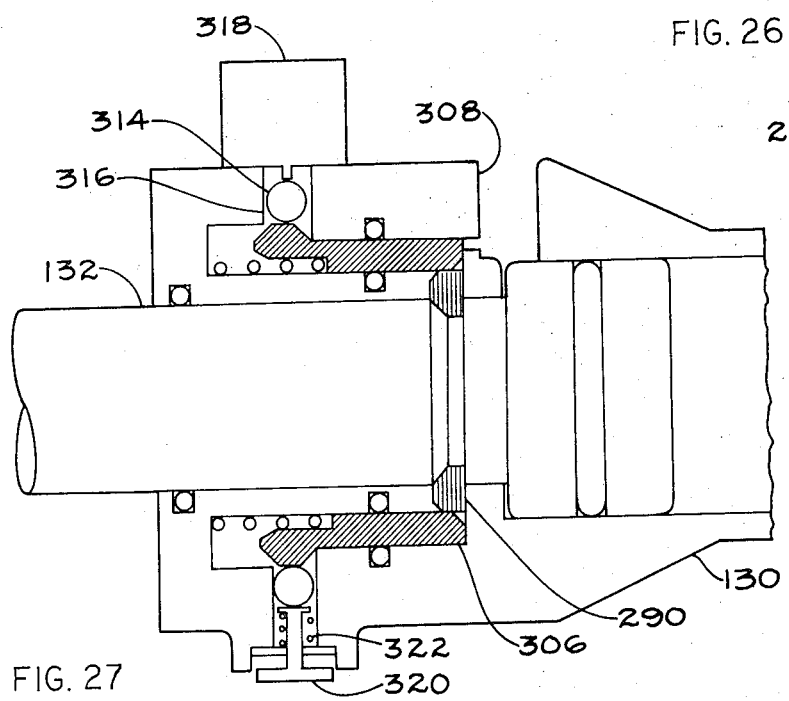
Figure 28:
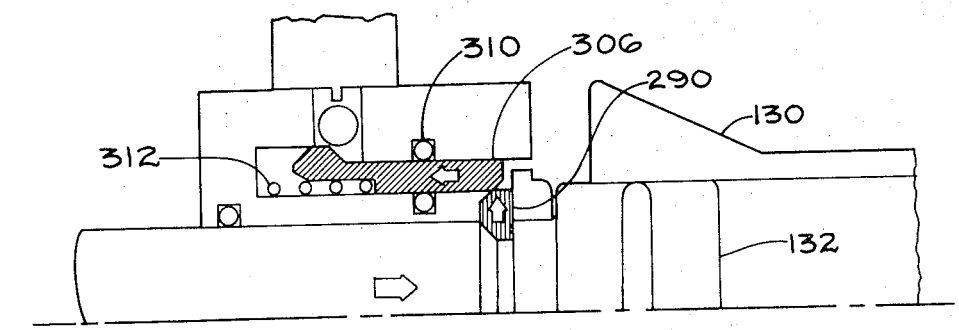
Figure 29:
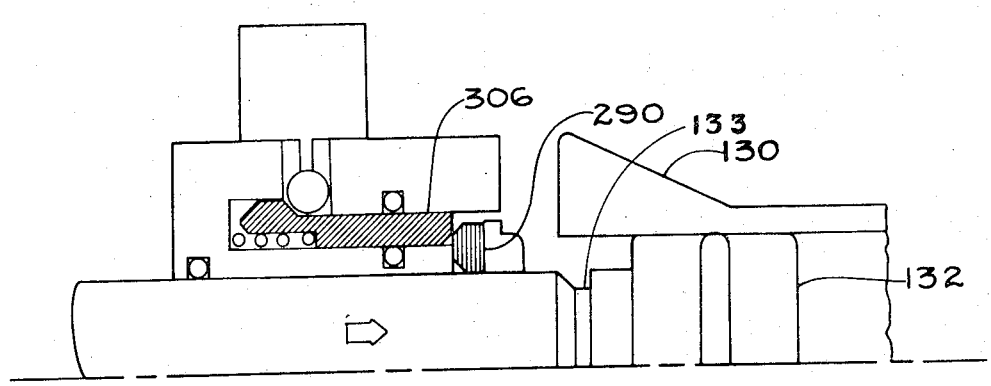

A Nearly Complete Chamfered Resilient Split Locking Ring Utilized in a Main Landing Gear Actuator As the Primary Down Lock, With the Inside Diameter Portions Directly Receiving the Principal Axial Shear Loads The shear loading carrying capacity and the reliability of the nearly complete chamfered resilient split locking ring is illustrated in FIGS. 27, 28, and 29. In FIG. 27, the locked down position is shown. The piston 132 has fully extended and the shear load is being transferred to the cylinder 308 through the locking ring 290. The actuated sleeve 306 is held in place by spring 312 blocking the locking ring 290. The locked position is signaled through a contact ball 316 to micro switch 318 and beyond for observation in the airplane cockpit, and this locked position is also visually observed through a contact ball 316 and a spring 322 retracted visual indicator-plunger 320 pushed outwardly against the retracting spring force, as long as the actuated sleeve 306 is in its locking position indicating the locking ring 290 is in its locked position.

In FIG. 28, hydraulic fluids under pressure have entered retract port 308 and have become effective in moving actuated sleeve or locking sleeve-piston 306 clear of locking ring 290. Its hoop compression and the driving forces occurring at the mating chamfered structures of the locking groove 133 on piston 132 and on the locking ring 290 become immediately and quickly effective in clearing the locking ring 290, as shown in FIG. 29, so the piston 132 retracts freely and the landing gear, not shown, is retracted.

Figure 30:
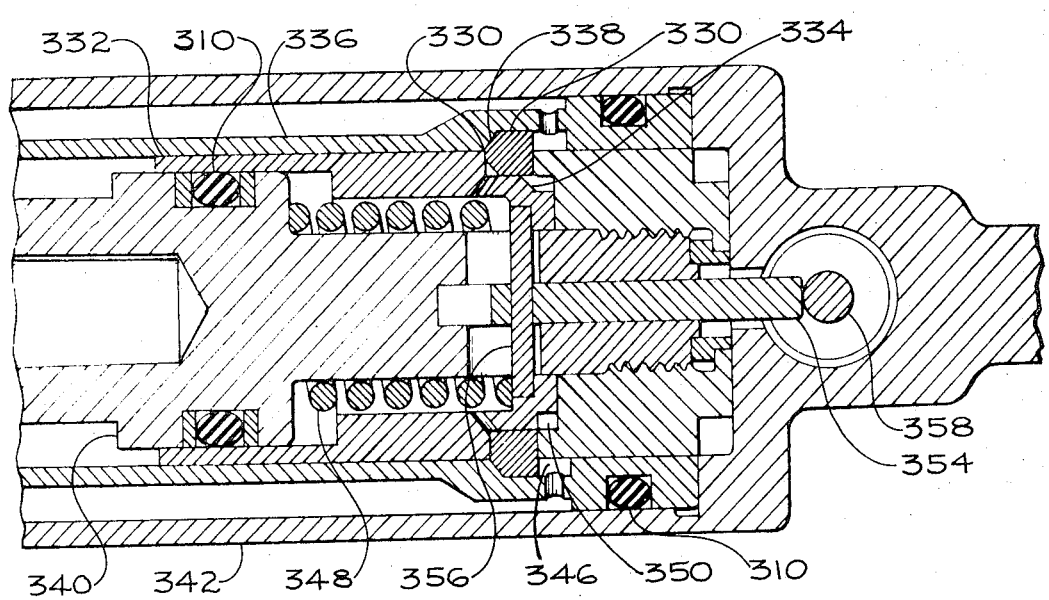
Figure 31:
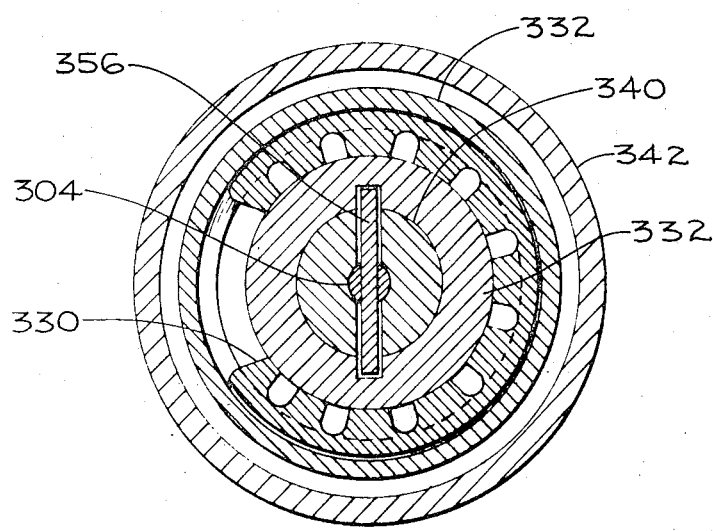

Locking a Nose Landing Gear In Its Retracted Position With a Nearly Complete Resilient Chamfered Split Locking Ring Which is Positioned by Cooperating Chamfered Cam Surfaced Structures on Interior Parts As illustrated in FIGS. 30 and 31 the locking ring 330 is operated within an overall actuator of a nose landing gear, not shown fully, as an interior hollow cylindrical sleeve serving as a lock piston 332, which has a circumferential chamfered or cam surface 334, cooperates with a larger diameter sleeve 336, which also has a circumferential chamfered or cam surface 338, to enlarge or to reduce the ring 330 which has a pair of complementary circumferential chamfered or cam surfaces. The enlargement of the locking ring 330 into a locking position, as illustrated in FIGS. 30 and 31, is undertaken as the main hydraulic system pressurized fluid is moving the major piston 340 into the end of the major cylinder 342, as shown in FIG. 30. The same main hydraulic system pressurized fluid also drives the lock sleeve or piston 332, in its sleeve configurations, into an expanding contact with the Decoto Lock Ring 330. Ring 330 then enters a locking groove 346 in the sleeve 336.

In such position, the overall actuator assembly shown only in part in FIGS. 30 and 31, remains locked together. Any reduction in the hydraulic pressure and/or any occurrance of any excessive vibrations fail to dislodge this Decoto Lock Ring 330 because there is always present a biasing force provided by a coiled compression spring 348.

When reverse movement of major piston 340 is wanted, the hydraulic fluid pressure applied oppositely moves the lock sleeve or piston 332 away from the location of locking groove 346 and from under ring 330, thereby creating a space, by its receiving groove 350. Then Decoto Lock Ring 330 may be moved into this receiving groove 350 when guided by the chamfered or cam surface 330 on sleeve 336, reducing the diameter of ring 330, as major piston 340 moves out carrying the Decoto Lock Ring 330 with it.

When the locking ring is returned to its locked position, a plunger 354 mounted by a pin 356 to the lock piston 332, is in a position to contact a balanced piston 358 in the major cylindrical body 342, which in turn moves to activate an electrical switch of an indicator circuit, not shown.

Figure 32:
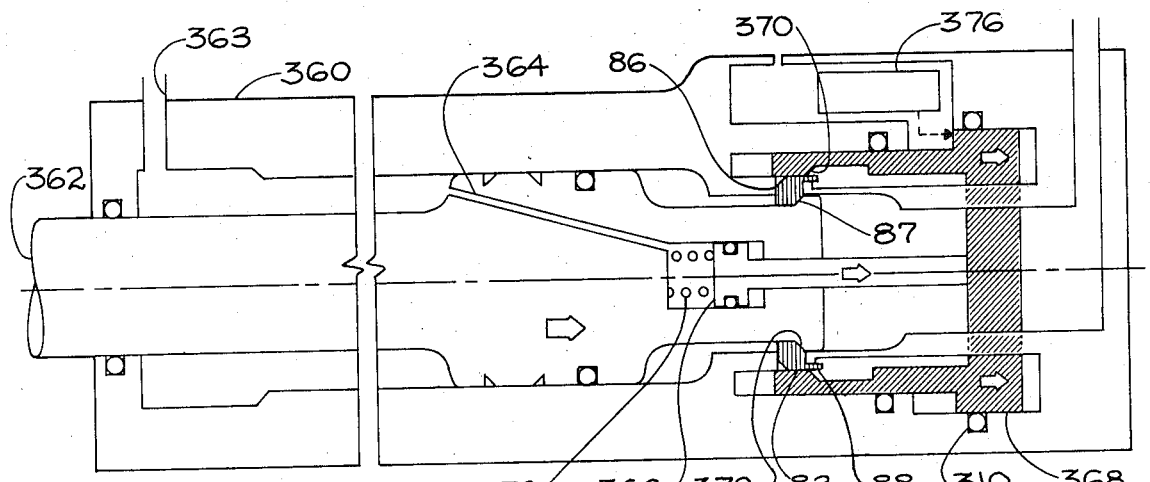
Figure 33:
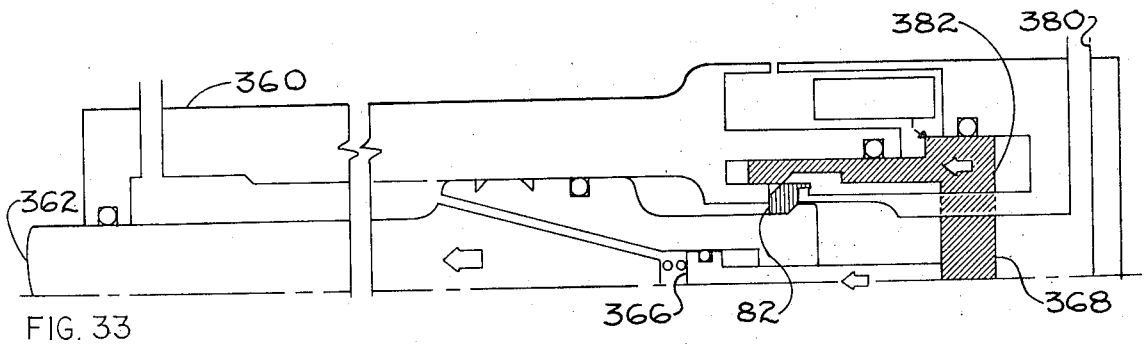
Figure 34:
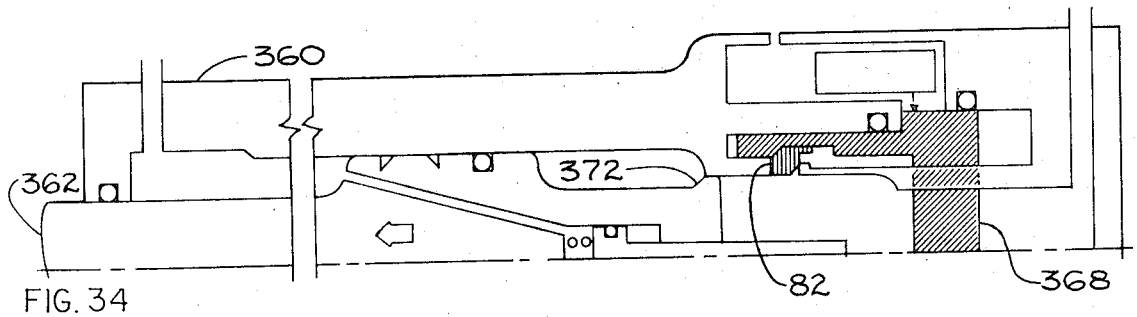

Utilization of Different Types of Nearly Complete Resilient Chamfered Split Locking Rings With Respective Actuated Means to Flex Them, In Locking An Actuator at Each End of Its Travel In Controlling a Leading Edge Slat of an Airplane Wing In FIGS. 32, 33, and 34, the piston 362 of the actuator for a leading edge slat of an airplane wing is illustrated when retracted. In FIGS. 35, 36, 37, 38, 39 and 40 the same piston 362 is shown when it is extended.

In FIG. 32, piston 362, under the pressure of a hydraulic fluid entering the cylinder 360 through retract port 363, is completing its retracting movement. The hydraulic fluid, moving also through passageway 364, has moved locking piston 366, whose extended portion drives retaining and locking sleeve 370 into a position where it positions flanged locking ring 87 in its fully locked position, holding the piston and cylinder together. The flange 88 on locking ring 87 serves in its positioning and its retention. If in part damaged, separate parts of the locking ring 87 will be so retained until recovered by utilizing this flange configuration.

In FIG. 33, hydraulic oil under pressure is entering extend port 380 and driving the lock ring retaining and locking sleeve 382 clear of the locking ring 88. The chamfered structure 370 on sleeve 382, like mating chamfered structure 86 on locking ring 87, like chamfered mating structure 372 on locking ring 87, and like chamfered mating structure 372 on piston 362, all are reacting to unlock the piston, as shown in FIG. 34.

Figure 35:
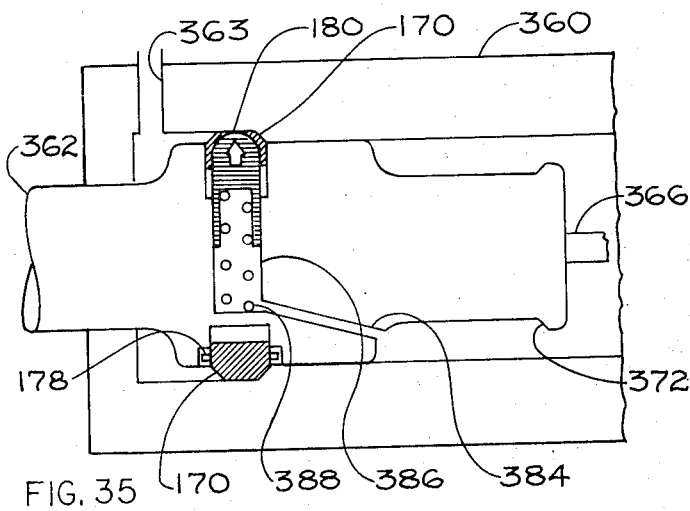
Figure 36:
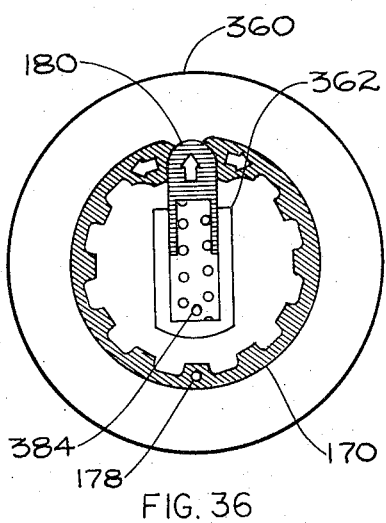

In FIGS. 35 through 40, the opposite end of the travel of piston 362 is illustrated. In FIGS. 35 and 36, extend hydraulic fluid under pressure has just moved the piston 362, where the locking ring 170 has just been flexed into a larger diameter under hoop tension as the radial moving partial hollow core locking piston 180 has been moved by the hydraulic fluid under pressure in passageway 384 into the opening of the otherwise complete resilient chamfered split locking ring 170. Spring 388 serves to keep the locking ring 170 in its locked position and assures it will so remain there if hydraulic pressure is lowered or lost.

Figure 37:
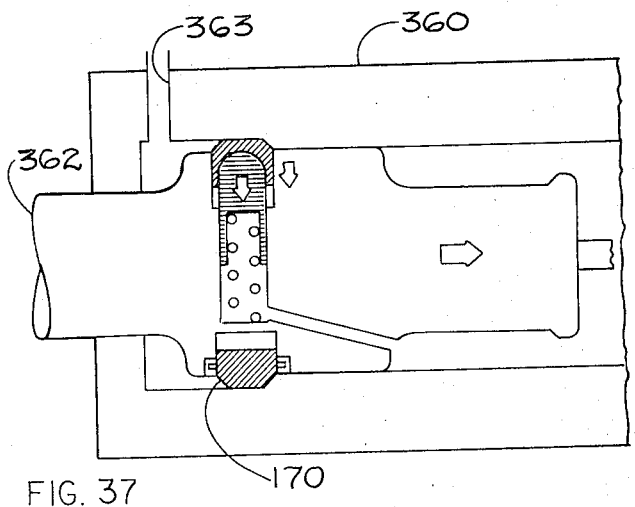
Figure 38:
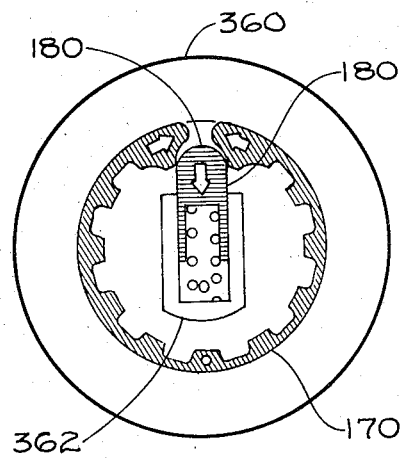
Figure 39:
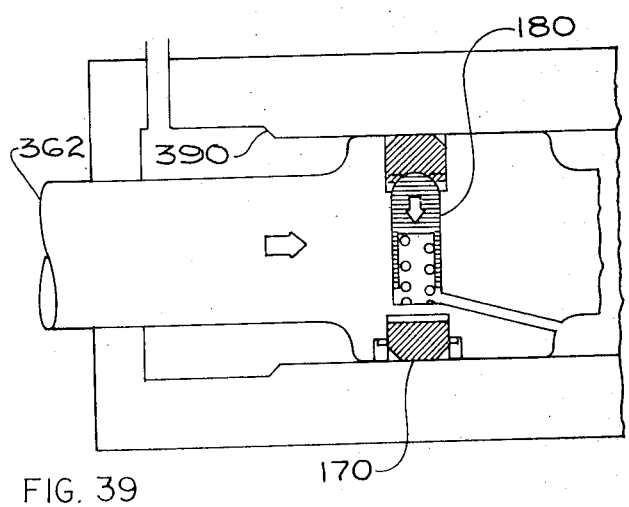
Figure 40:
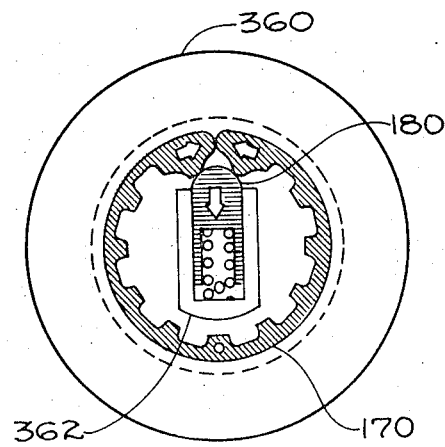

In FIGS. 37 and 38, the retract port 363 is receiving hydraulic fluid under pressure and it becomes effective in retracting the locking piston 180. Also, the chamfered structure 390 of the cylinder and the chamfered structure of the ring 170 mate to transmit unlocking forces to the locking ring 170, as the retract fluid under pressure is then moving piston 362. The all clear position is illustrated in FIGS. 39 and 40 as the piston 362 is returning.

Figure 41:
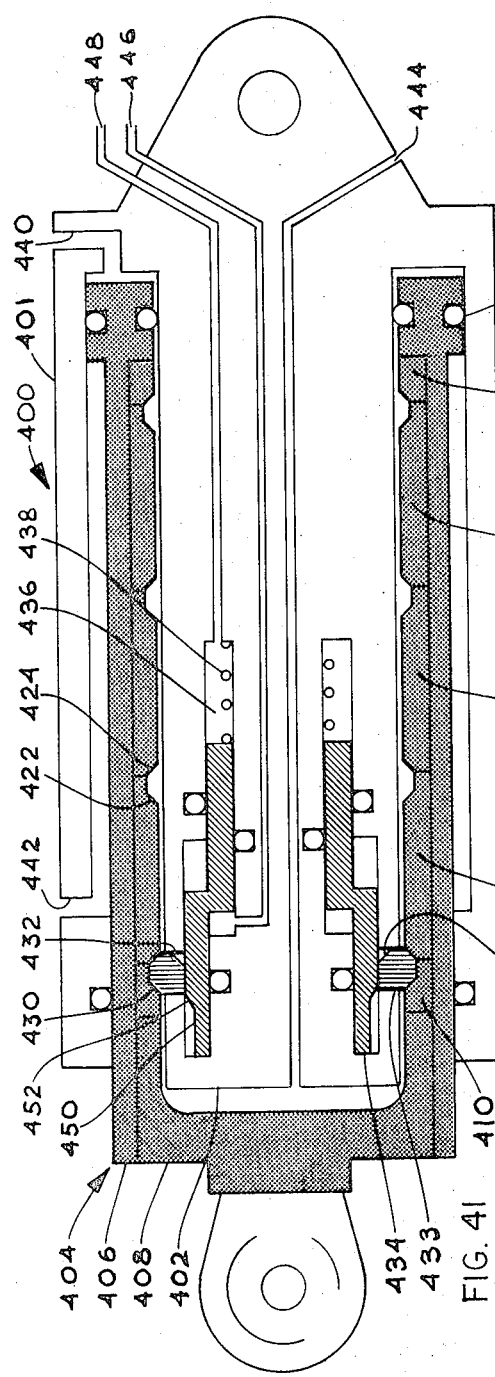
Figure 42:
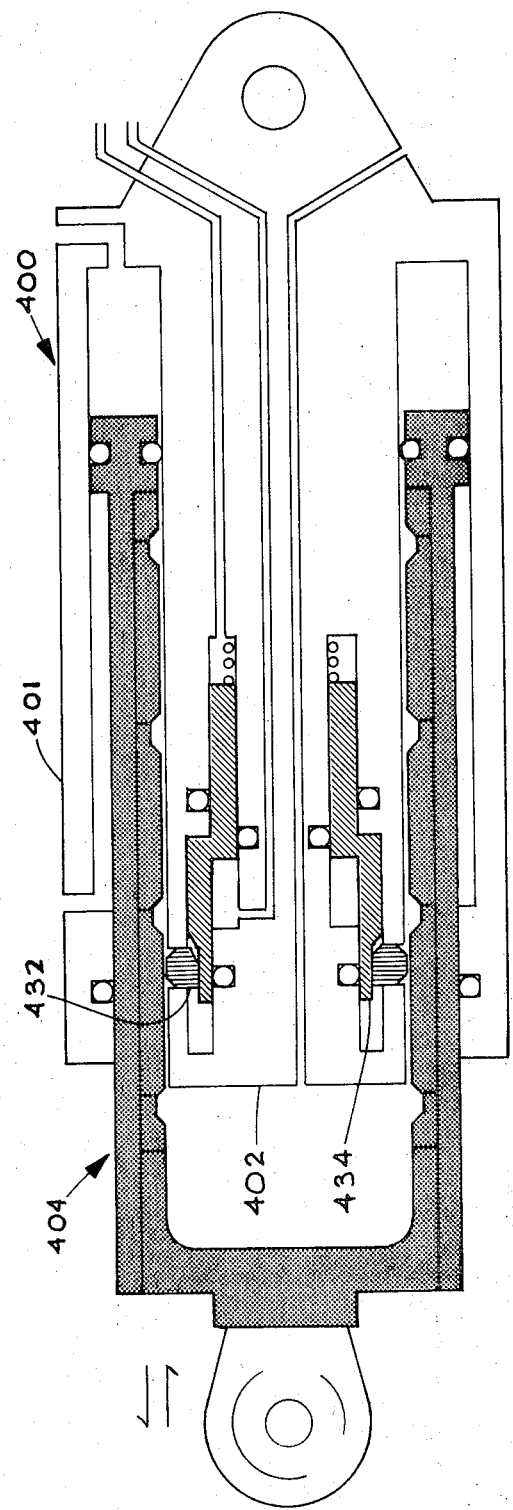

Utilization of a Nearly Complete Flexible, Resilient, Chamfered Split Locking Ring in an Actuating Mechanism Used in Industrial Machinery Which Must be Stopped at Selected Locations Throughout the Overall Travel In FIGS. 41 and 42, an actuator mechanism for industrial machinery such as a chipping and sawing machine used in a lumber mill is illustrated. The chippers and saws of such machinery are located at different positions to be effective in obtaining the best lumber products from the logs. Therefore, throughout the overall travel of the actuator mechanism selectable stopping locations are made available where the actuator mechanism may be locked. These locations are made possible by the provision of a piston 404, having an outer portion 406 with a hollow interior lined with segments 410, 412, 414, 416, and 418 which determine the location of several spaced locking grooves 430 having chamfered structures 422 and 424. The head portion of the piston 408 and the outer portion 406 are separable for the removal and interchange of the segments with others to rearrange the spacing and/or number of the locking grooves 430.

Inside the hollow interior of outer cylindrical portion 406 of the piston 404 is a central body 402 of the cylinder 400, which also has an outer portion 401 surrounding the piston 404. Seals 310 are therefore in this configuration never in a position to be passed over the multiple spaced locking grooves 430, nor over the locking ring 432 which is positioned in the groove 43 on the central body 402 of cylinder 400.

To extend the piston 404, hydraulic fluid under pressure enters port 440 and the hydraulic fluid under pressure has also entered the unlock port 446 to move the actuated sleeve 450 clear of locking ring 432 against positioning spring 438 in space 436. The chamfered structure 424 of this locking groove 430, the outside chamfered structure on the locking ring 432, one of the inside chamfered structures 454 on the locking ring 432, and the chamfered structure 452 on the sleeve 450 all are cooperating during this unlocking. The cleared position of all the actuator components is illustrated in FIG. 42.

During travel the extend pressure is maintained and then when wanted, in reference to another selected lock position, hydraulic fluid is supplied at the lock port 448 and the actuated sleeve 432 is ready to become effective when the locking ring 432 reaches the selected locking groove 430. Here again related chamfered structures on the cooperating locking mechanisms mate and are effective in the quick locking of the overall actuator. Through port 444, hydraulic oil is returned from the head of the central portion 402 of the cylinder 400. The ring 432 rests on the cylindrical portion 450 of actuated sleeve 434 when it is in its unlocked position, as shown in FIG. 42. The sleeve 434 in its locked position abuts the termination of space 436 in which it moves and is thereby accurately positioned to maintain the locking ring 432 in one of the selected locking grooves 430.

Utilization of a Nearly Complete Flexible, Resilient, Chamfered Split Locking Ring in an Actuating Mechanism Used in Aircraft In FIGS. 43 and 44, an actuating mechanism is illustrated which is useful, for example, in aircraft, to selectively position an airscoop to create different size effective openings depending on the requirements at particular times and/or speeds of air travel. A cylinder 460 has an outer cylindrical portion 462 and an inner central portion 464. The piston 480 has a hollow cylindrical portion 482 designed to move in and out of the cylindrical space located between the outer cylindrical portion 462 and inner central portion 464 of the cylinder 460.

In the interior of the outer cylindrical portion 462 of cylinder 460 several adjacent cylindrical segments 468, 470, 472 and 474 provide a selected number of locking grooves at selected variable spacing. These segments are designed with portions of a locking groove comprising their end portions. Access to them for their inspection, exchange, or complete rearrangement and substitutuion, to acquire new spacing of the same or a different number of locking grooves is undertaken by removing the end portion 476 of cylinder 460.

In FIG. 43, a fully retracted and locked position of the actuating mechanism is illustrated. To reach this locked position, hydraulic oil under pressure has been supplied through retracting port 500, and hydraulic oil under a higher pressure, for example, 50 p.s.i. higher, has been supplied through locking port 502. The higher pressure oil in space 484 effectively moves locking sleeve 490 to drive locking ring 50, utilizing the chamfered structure 492 and a mating chamfered structure on the locking ring, out of the receiving groove 491 and into the locking groove 471, which also has chamfered structures.

In FIG. 44, the unlocked position of the actuating mechanism is illustrated. To reach this traveling position, hydraulic oil under pressure has been supplied through extending port 506, and the hydraulic pressures both in the retracting port 500 and locking port 502 have been lowered. Both the piston 480 and the locking actuated sleeve 490 receive this hydraulically created force. Therefore sleeve 490 is moved against the force of holding spring 494, located in space 484, and positions its receiving groove 491 below locking ring 50. The respective chamfered surfaces become active with the pressure being applied to piston 480 and locking ring 50 is decreased in diameter and is cleared from its locking position. Chamber 508 of cylinder 460 continues filling with high pressure oil and piston 480 moves toward a new position determined by a selected locking groove 471. Just prior to the arrival at one of the locking grooves 471, higher pressure oil is supplied through locking port 502 and actuated sleeve 490 is triggered and ready to help in the positioning of locking ring 50 in its locking position in the selected locking groove 47 where it sustains the full axial shear load.

Air scoops and other components of aircraft and other components of many overall mechanisms are selectively locked in many positions as indicated by this actuating mechanism illustrated in FIGS. 43 and 44 and also the actuating mechanism previously shown in FIGS. 41 and 42. Throughout these multiple stop and lock actuating mechanisms, the sealing rings 310 are never positioned to be rubbed by any locking ring nor to have the opportunity of partially or completely moving into and out of a locking groove 471.

Figure 45:
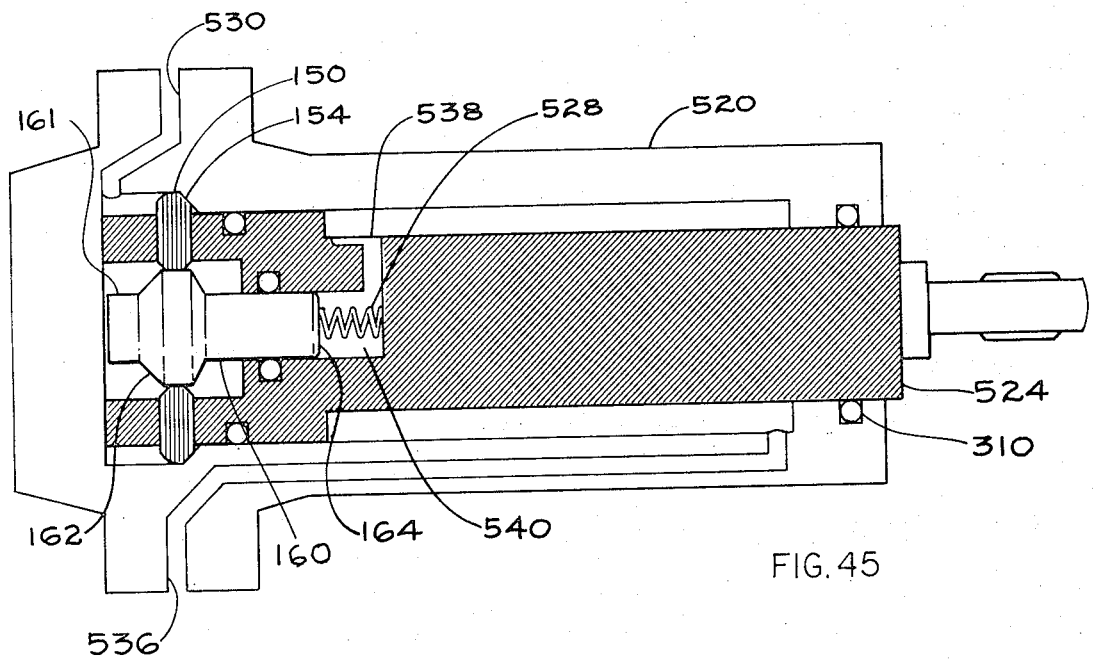
Figure 46:
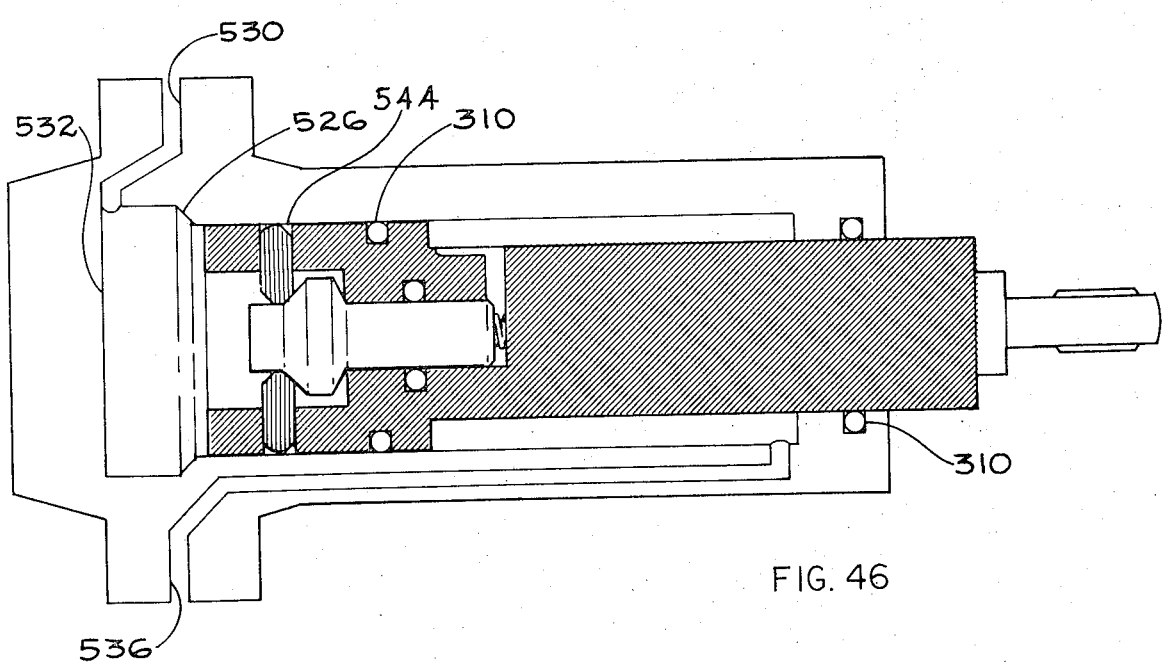

A Locking Subassembly, Utilizing a Resilient Chamfered Locking Ring Actuated Upon Axial Movement of a Locking Actuator Piston, Locks an Actuator in its Retracted Position to Hold an Airplane Reverse Thrust Component in its Retracted Position In FIGS. 45 and 46, a hydraulic actuator is illustrated which is used, for example, to operate a reverse thrust component on an aircraft engine nacelle. Inadvertent extension of a reverse thrust component, for example, a vane structure to change the flow of exhaust gases, is not wanted. Therefore, the component must be locked in its retracted position.

This is undertaken by locking its actuator in the retracted position, as shown in FIG. 45. Retract pressurized hydraulic oil has been effectively applied through retracting port 536 to move piston 524 into cylinder 520, and also to attempt to move the locking piston 160 axially, as the hydraulic oil under pressure enters passageway 538 and reaches space 540, where the locking piston end 164 is and also the holding spring 528 is located. When piston 524 reaches the end of its stroke in the enlarged interior 532 of cylinder 520, which has a chamfered structure 154, the chamfered resilient split locking 150, is expanded in diameter, upon the axial movement of locking piston 162. The receiving surface structure 161 on locking piston 160 and the adjacent chamfered structure 162 combine to move the locking ring 150 into its locking position. Thereafter, the overall actuator and the reverse thrust component attached to it at the aircraft engine installation, are both locked in their retracted position.

In FIG. 46, unlocking has occurred and piston 524 is free to extend. Hydraulic oil under pressure entering extending port 530, and chamber 532 effectively moves the axially located locking piston 160 against the force of holding spring 528, which is used to otherwise assist in locking and maintaining the lock position. Piston 160 soon clears the way for locking ring 150 to be reduced in diameter, employing chamfered structures, as the main piston 524 moves. Thereafter, locking ring 150 is carried along with the piston 524 while it remains in position in the receiving space 544 and is supported on surface structure 161 of locking piston or pin 160.

The Importance of the Accurate Determination of the Angle Alpha

All the Chamfered Structures, when they are to receive, retain, and/or release the overall major axial shear load, must be determined by computing the critical angle Alpha. In the computations full consideration is given to determining the spring rate of the entire system involving the related mechanisms. At all times the correct determination of angle Alpha and its employment during manufacture is needed in conjunction with the loading and unloading of the locking rings, to avoid destruction of the rings and all their related components, and to thereby insure a continued long life span of repetitive locking and unlocking operations under full load. If the angle Alpha is not computed, or not computed accurately, upon subsequent operations, the locking rings and locking grooves commence their independent selfdetermination and formation of the angle Alpha on the improperly chamfered surfaces. As a consequence, excessive wear and/or breakage may soon be the result.

However, it is to be understood that other chamfer angles may be used in manufacturing other parts which will not be directly involved in handling the maximum axial shear loads. These other angles are referred to as cocking angles or resetting angles and even in the same overall installations of main actuators, these other angles may be different than angle Alpha, because their related components are not directly receiving, transmitting and unloading the major axial shear loads.

The Manufacture of Locking Rings Originally to Their Selected Initial Maximum, Mid, or Minimum Diameter in Preparation For the Stresses to be Encountered For various installations, the locking rings will be manufactured for their selected intial maximum, mid, or minimum diameter that they will be moved to during their radial expansion and contraction. In the hold back bar assembly the principal locking ring is manufactured to its maximum diameter. In other installations the rings will be designed to maximum, mid, or minimum diameter to achieve the overall best locking, holding, and unlocking, operations in view of the primary objectives of load holding, ring positioning, speed of locking and unlocking, locking ring stresses, etc.

Summary of Advantages of Using a Nearly Complete One Piece Flexible, Resilient, Chamfered Split Locking Rings and Their Chamfered Locking Groove Structures, and Their Immediate Actuators Main actuator mechanisms moving and controlling many components of all types of machinery and vehicles, especially aircraft, are lockable and releasable under many axial shear loading conditions, far exceeding loading limitations previously encountered in trying to design locking mechanisms for such main actuator mechanisms, when overall size spaces were to be more restrictive and yet axial shear load carrying capabilities were to be increased. Moreover, new actuator mechanism designs have been forthcoming. For example, now actuator mechanisms are locked enroute at one or more selected positions between either fully retracted or extended positions of a major actuator. Also these different locking positions may be altered from time to time by a convenient changeover modification.

Throughout all actuator mechanisms locked by these nearly complete, one piece, flexible, resilient, chamfered, split, locking rings, and their chamfered locking grooves, the overall locking efficiency is very great and the weight added and size increases attributable to the locking subassembly is negligible, by comparison, with all former locking subassemblies. Moreover, the reliability and predictability of all the overall main actuator mechanisms is enhanced as these locking subassemblies, utilizing the Decoto Lock Ring, as the locking ring, are very reliable in their repetitive operations unlocking and locking under extreme axial shear loadings for throughout the overall mechanisms the spring rate of the related system is fully considered.

We claim:

1. A nearly complete resilient locking ring to be sequentially altered in its hoop tension or compression changing its effective diameter and adaptable under full load to lock and unlock coaxial translatable members by respectively interfitting with ring receiving means on both members to transmit complete shear loads between them and to fit completely into one of the members to assume no shear loads, comprising: a nearly complete lock ring of one piece having sufficient resiliency to be altered in diameter upon changing its hoop stresses, having one portion that always remains in one translatable member during both locked and unlocked conditions and it is formed with spaced radial flex notches to increase the flexibility of the locking ring when its diameter and hoop stresses are being changed, having a chamfered edge around its other portion that moves from the ring receiving means of one translatable member into the rings receiving means of the other translatable member as its diameter and hoop stresses are changed to abruptly move the locking ring into and out of the locking position, the chamfered edge aiding the entry and removal of the locking ring, with respect to the ring receiving means and an angle Alpha of the chamfered edge being determined by the formulae which fully encompasses consideration of the spring rate of the members to be locked, wherein $e = (SL/E) = Am = Rd$ tangent of angle Alpha where tangent of angle Alpha $\geq e/Rd$ and where:

$e$ is equal to the longitudinal strain of a piston translatable member, for example of length $L$;

$Rd$ is equal to the radial displacement of the locking ring which occurs as it unlocks;

$Am$ is equal to the axial displacement of the locking ring during its unlock phase;

Alpha is equal to the angle of chamfer on the locking ring and in the ring receiving means; and $S$ is the average stress in the coaxial member, such as the translatable piston, having length $L$, which is caused by the external load $P$.

2. A nearly complete resilient locking ring, as claimed in claim 1, having an additional chamfered edge around its one portion that always remains in the one translatable member, also formed at the angle Alpha, and adaptable to coact with like chamfered structures on a reversible translatable sleeve actuator.

3. A nearly complete resilient locking ring, as claimed in claim 1, wherein its ends, which are slightly spaced, are formed with partial spherical like receiving portions to receive actuator forces applied by a plunger having a force transmitting partial spherical like end to change the diameter and hoop stresses of the nearly complete resilient locking ring.

4. A nearly complete resilient locking ring, as claimed in claim 1, wherein its inside diameter structures are chamfered, being also formed at the angle Alpha, and are adaptable to coact with like chamfered structures on a plunger to change the diameter and hoop stresses of the nearly complete resilient locking ring.

5. Locking ring mechanism assemblies for repeatedly mutually interlocking and unlocking under load coaxially related principal load carrying members which are otherwise mechanically free to translate relative to one another, and each have locking ring receiving means, wherein a nearly complete resilient flexible split chamfered locking ring is changed under load in radial hoop tension or compression to change its effective diameter and when in its locking position in the locking ring receiving means, it carries and transfers the full axial shear loading carried by the coaxial members and it is lockable and unlockable under load, comprising:

a. a nearly complete chamfered resilient flexible split locking ring changeable in its effective diameter, alternately, to be received in only the locking ring receiving means of one relative translating coaxial member, and to be received in the locking ring receiving means of both translating coaxial members when alignment of these locking ring receiving means occurs to then serve as the only common locking member keeping the outer and inner principal load carrying members from translating with respect to one another and thereby transmitting the full shear loads even though being comparatively small in diameter; and b. locking ring receiving means for each of relative translating coaxial members, at least one of which has a chamfered entry to mate with the chamfered locking ring during locking and unlocking under load, and all the chamfered structures are matched by an angle $\alpha$ determined in reference to the spring rate of an entire locking ring mechanism assembly and the principal load carrying members, wherein the angle Alpha of the respective mating chamfered portions of the locking ring and the locking ring receiving means are determined by using the formulae:

$e = SL/E = Am = Rd$ tangent of angle Alpha where tangent of angle Alpha $\geq e/Rd$.

6. Locking ring mechanism assemblies, as claimed in claim 5, comprising, in addition, a cylindrical axially translatable actuator sleeve having a like chamfered structure to mate with the locking ring, so modified with a chamfered structure, so when translating forces are applied to the axially translatable actuator sleeve, the diameter and hoop stresses of the locking ring are able to change, and the locking ring under the force of the major axial loading abruptly moves from its locking position.

7. Locking ring mechanism assemblies, as claimed in claim 5, wherein the locking ring receiving means for one of the relative translating coaxial members is supplemented by additional locking ring receiving means, all of which are complementary chamfered and spaced throughout the range of relative movement of the translating coaxial members, whereby the locking and unlocking of these members, may be undertaken under load at selected positions throughout this range of relative movement.

8. Locking ring mechanism assemblies, as claimed in claim 7, wherein the additional locking ring receiving means are composed also of interchangeably positioned components which are arranged to be selectably repositioned to change the spacing between these locking ring receiving means.

9. Locking ring mechanism assemblies, as claimed in claim 5, having, in addition, a hydraulically operated control means for allowing the effective diameter changes, often under full axial loading, of the nearly complete chamfered resilient flexible split locking ring, comprising, a source of hydraulic fluid under pressure, a hydraulic cylindrical structure to receive the hydraulic fluid, and a hydraulic piston movable in the hydraulic cylindrical structure to in turn be moved relative to the nearly complete chamfered resilient flexible split locking ring to allow effective diameter changes of this locking ring, during unlocking and locking.

10. Locking ring mechanism assemblies, as claimed in claim 9, having, in addition, spring means to insure the positioning of the hydraulic piston of the control means in a locked position during possible periods of no hydraulic pressure, to thereby keep the nearly complete chamfered resilient flexible split locking ring in its locking position.

11. Locking ring mechanism assemblies, as claimed in claim 5, having, in addition, a triggering control subassembly to allow the nearly complete chamfered resilient flexible split locking ring to change its effective diameter under full axial loading, comprising, a restraining bar arranged to be pulled by the axial loads, and a chamfered actuator secured to the restraining bar to be moved clear of this locking ring when the restraining bar reaches a predetermined elongation within its elastic limit and thereby an unlocking sequence is commenced.

12. Locking ring mechansim assemblies, as claimed in claim 11, having, in addition, principal interengaging chamfered components for their abrupt unlocking of the major axial loads, when cleared by the triggering control subassembly.

13. Locking ring mechanism assemblies, as claimed in claim 11, having, in addition, a manual release means to release the triggering control subassembly without waiting for the elongation of the restraining bar.

14. Locking ring mechanism assemblies, as claimed in claim 13, wherein the manual release means is visually observable to indicate the complete locking of the triggering control subassembly.

15. Locking ring mechanism assemblies, as claimed in claim 11, having, in addition, a connecting subassembly adaptable to be interconnected to a deck of an aircraft carrier and an aircraft to be launched from a catapult of the aircraft carrier.

16. Locking ring mechanism assemblies, as claimed in claim 9, having, in addition, a means to utilize the source of hydraulic fluid under pressure which is also the source of hydraulic fluid for the actuation of the relative translating coaxial members.

17. Locking ring mechanism assemblies, as claimed in claim 16, having, in addition, a regulating means to select a pressure of the hydraulic fluids obtained from the source of the hydraulic fluid used in actuating the relative translating coaxial members.

18. A nearly complete resilient locking ring to be sequentially altered in its hoop tension or compression changing its effective diameter and adaptable to lock and unlock coaxial translatable members by respectively interfitting with both members to transmit complete shear loads between them and to fit completely into one of the members to assume no shear loads, comprising: a nearly complete lock ring of one piece having sufficient resiliency to be altered in diameter upon changing its hoop stresses, having one portion that always remains in one translatable member during both lock and unlocked conditions and it is formed with spaced radial flex notches to increase the flexibility of the locking ring when its diameter and hoop stresses are being changed, having a chamfered edge around its other portion that moves from the one translatable member into the other translatable member as its diameter and hoop stresses are changed to abruptly move the locking ring into the locking position, the chamfered edge aiding the entry of the locking ring, having a second chamfered edge, opposite its first chamfered edge, around its other portion that moves from one translatable member into the other translatable member as its diameter and hoop stresses are changed to abruptly move the locking ring into locking position, the second chamfered edge aiding the entry of the locking ring when translating members are being locked while traveling in the opposite direction, and having its split apart ends which are closely spaced formed with partial spherical like receiving portions to receive actuator forces applied transversely by a plunger having a force transmitting partial spherical like end to change the diameter and the hoop stresses of the nearly complete resilient locking ring.

* * * * *